(12) United States Patent
Tsuboi et al.

(10) Patent No.: US 12,275,188 B2
(45) Date of Patent: Apr. 15, 2025

(54) THREE-DIMENSIONAL SHAPING DEVICE

(71) Applicant: Seiko Epson Corporation, Tokyo (JP)

(72) Inventors: Tatsuya Tsuboi, Okaya (JP); Kenta Anegawa, Matsumoto (JP)

(73) Assignee: SEIKO EPSON CORPORATION (JP)

(*) Notice: Subject to any disclaimer, the term of this patent is extended or adjusted under 35 U.S.C. 154(b) by 62 days.

(21) Appl. No.: 17/725,620

(22) Filed: Apr. 21, 2022

(65) Prior Publication Data

US 2022/0339867 A1 Oct. 27, 2022

(30) Foreign Application Priority Data

Apr. 22, 2021 (JP) .................................. 2021-072403

(51) Int. Cl.
*B29C 64/209* (2017.01)
*B29C 64/188* (2017.01)
(Continued)

(52) U.S. Cl.
CPC .......... *B29C 64/209* (2017.08); *B29C 64/188* (2017.08); *B29C 64/232* (2017.08);
(Continued)

(58) Field of Classification Search
CPC ... B29C 64/209; B29C 64/295; B29C 64/314; B29C 64/307; B29C 64/214;
(Continued)

(56) References Cited

U.S. PATENT DOCUMENTS 9,969,122 B1 * 5/2018 Smiddy .................... B29C 35/16
10,254,499 B1 * 4/2019 Cohen .................... B29C 64/321
(Continued)

FOREIGN PATENT DOCUMENTS

CN 107287588 A * 10/2017
DE 102016200522 A1 * 7/2017
(Continued)

OTHER PUBLICATIONS

Chen X. et al. "English Machine Translation of CN107287588A Forging device and method and laser fusion covering system and method". 2023. EPO. Espacenet. (Year: 2023).*
(Continued)

*Primary Examiner* — Seyed Masoud Malekzadeh
*Assistant Examiner* — Jonathan B Woo
(74) *Attorney, Agent, or Firm* — Harness, Dickey & Pierce, P.L.C.

(57) ABSTRACT

A three-dimensional shaping device includes: a plasticization unit that plasticizes at least a part of a material to produce a shaping material; a nozzle that ejects the shaping material to an uppermost layer; a moving mechanism that changes a relative position between the nozzle and the uppermost layer; a control unit that controls the moving mechanism such that the shaping material is ejected from the nozzle to the uppermost layer; and a compression unit that has a contact surface with a shape surrounding the nozzle and is capable of compressing the shaping material by bringing the contact surface into contact with the shaping material ejected to the uppermost layer.

16 Claims, 13 Drawing Sheets

(51) Int. Cl.
- B29C 64/232 (2017.01)
- B29C 64/295 (2017.01)
- B29C 64/314 (2017.01)
- B33Y 30/00 (2015.01)
- B33Y 40/10 (2020.01)
- B33Y 40/20 (2020.01)

(52) U.S. Cl.
CPC .......... B29C 64/295 (2017.08); B29C 64/314 (2017.08); B33Y 30/00 (2014.12); B33Y 40/10 (2020.01); B33Y 40/20 (2020.01); *B29C 2793/0027* (2013.01)

(58) Field of Classification Search
CPC ... B29C 64/218; B29C 64/194; B29C 64/188; B33Y 40/10; B33Y 40/20; B22F 12/60; B22F 12/63; B22F 12/67; B22F 10/50; B22F 10/64; B22F 12/13; B22F 12/17
See application file for complete search history.

(56) References Cited

U.S. PATENT DOCUMENTS

| | | | | |
|---|---|---|---|---|
| 2015/0108677 | A1* | 4/2015 | Mark | B33Y 70/10 425/375 |
| 2016/0009029 | A1* | 1/2016 | Cohen | B29C 64/209 264/250 |
| 2016/0107389 | A1* | 4/2016 | Lind | B29C 64/393 425/375 |
| 2016/0311165 | A1* | 10/2016 | Mark | B29C 64/386 |
| 2017/0129180 | A1* | 5/2017 | Coates | B23Q 11/0046 |
| 2017/0334137 | A1* | 11/2017 | Nystrom | B29C 64/393 |
| 2018/0326658 | A1* | 11/2018 | Saito | B29C 64/20 |
| 2019/0202118 | A1* | 7/2019 | Alfson | B29C 64/112 |
| 2020/0269502 | A1 | 8/2020 | Anegawa et al. | |
| 2020/0298484 | A1* | 9/2020 | Ageishi | B29C 64/241 |
| 2020/0306869 | A1* | 10/2020 | Hardwick | B23K 20/227 |
| 2021/0053283 | A1* | 2/2021 | Liu | B22F 10/18 |
| 2021/0078256 | A1* | 3/2021 | Anegawa | B29C 64/295 |
| 2021/0221056 | A1* | 7/2021 | Gjovik | B29C 64/118 |

FOREIGN PATENT DOCUMENTS

| | | | |
|---|---|---|---|
| JP | 2017-523063 A | | 8/2017 |
| JP | 2020011459 A | * | 1/2020 |
| JP | 2020-138342 A | | 9/2020 |
| JP | 2020-152068 A | | 9/2020 |
| JP | 2021-041626 A | | 3/2021 |
| KR | 102360771 B1 | * | 2/2022 |
| WO | 2015-193819 A2 | | 12/2015 |
| WO | WO-2017059842 A1 | * | 4/2017 ............ B22F 10/20 |

OTHER PUBLICATIONS

Min, K. "English Machine Translation of KR 102360771 B1." 2024. Espacenet. EPO. (Year: 2024).*

Siebeneich A. "English Machine Translation of DE-102016200522-A1". 2024. EPO. Espacenet (Year: 2024).*

Fischer G. "English Machine Translation of WO-2017059842-A1". EPO. Espacenet. (Year: 2024).*

JPO. "Notice of Reasons for Refusal". USPTO Global Dossier. Nov. 19, 2024. (Year: 2024).*

JPO. "Search Report by Registered Search Organization". USPTO Global Dossier. Sep. 17, 2024. (Year: 2024).*

JPO. "Written Opinion". USPTO Global Dossier. Oct. 18, 2024. (Year: 2024).*

JPO. "Notice of Reasons for Refusal". USPTO Global Dossier. Sep. 24, 2024. (Year: 2024).*

Anekawa K. "English Machine Translation of JP-2020011459-A". Dec. 3, 2024. EPO. Espacenet. (Year: 2024).*

* cited by examiner

THREE-DIMENSIONAL SHAPING DEVICE

The present application is based on, and claims priority from JP Application Serial Number 2021-072403, filed Apr. 22, 2021, the disclosure of which is hereby incorporated by reference herein in its entirety.

BACKGROUND

1. Technical Field

The present disclosure relates to a three-dimensional shaping device.

2. Related Art

JP-T-2017-523063 describes a three-dimensional shaping device including a pressure source configured to apply a pressure to a layer after a thermoplastic material is applied to the layer to densify a material, remove gaps or bubbles, and/or enhance adhesion between layers. JP-T-2017-523063 discloses that the pressure source is, for example, a compressed gas.

In the three-dimensional shaping device described in JP-T-2017-523063, the pressure source is coupled to a head via a support arm, and when a moving direction of a nozzle along the layer is changed, it is necessary to change a posture of the pressure source and move, with respect to the nozzle, a position where the pressure is applied to a subsequent layer. Therefore, complicated control of the pressure source may be required.

SUMMARY

A three-dimensional shaping device is a three-dimensional shaping device that shapes a three-dimensional shaped object by ejecting a shaping material to an ejection target surface on a table and laminating layers in a laminating direction. The three-dimensional shaping device includes: a plasticization unit that plasticizes at least a part of a material to produce the shaping material; a nozzle that has a nozzle tip surface where a nozzle hole opens, and ejects the shaping material from the nozzle hole to the ejection target surface; a moving mechanism that changes a relative position between the nozzle and the ejection target surface; a control unit that controls the moving mechanism such that the shaping material is ejected from the nozzle to the ejection target surface; and a compression unit that has a contact surface with a shape surrounding the nozzle when viewed from the laminating direction and is configured to compress the shaping material by bringing the contact surface into contact with the shaping material ejected to the ejection target surface.

DESCRIPTION OF EXEMPLARY EMBODIMENTS

Figure 1:
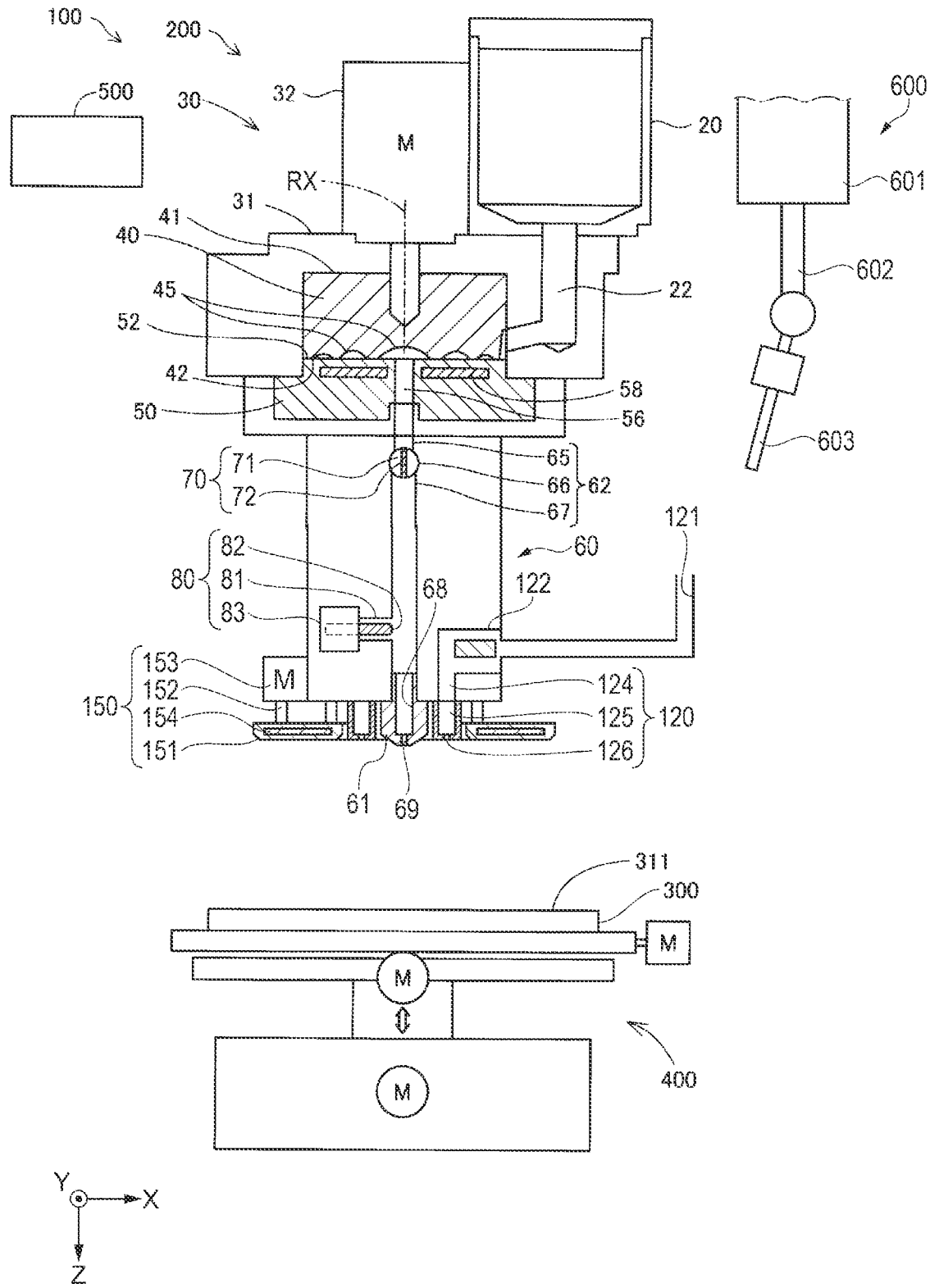
FIG. 1 is a schematic diagram illustrating a configuration of a three-dimensional shaping device as an embodiment of the present disclosure.

Hereinafter, the present disclosure will be described based on embodiments. In the drawings, the same members are denoted by the same reference signs, and redundant descriptions thereof will be omitted.

In the drawings, X, Y, and Z represent three spatial axes orthogonal to each other. In the present description, directions along these axes are defined as an X-axis direction, a Y-axis direction, and a Z-axis direction. The directions are specified by defining a positive direction as "+" and a negative direction as "−". A positive sign and a negative sign are used in combination in a direction notation, directions that are directed by arrows in the drawings are described as + directions, and opposite directions of the arrows are described as − directions. An X direction and a Y direction are directions along horizontal directions, and a Z direction is a vertical direction. A +Z direction indicates a vertically downward direction, and a −Z direction indicates a vertically upward direction. Further, the three spatial axes of X, Y, and Z, which neither limit the positive direction nor the negative direction, will be described as an X-axis, a Y-axis, and a Z-axis.

1. First Embodiment

As illustrated in FIG. 1, in the present embodiment, a three-dimensional shaping device 100 includes a shaping unit 200, a table 300, a moving mechanism 400, a cutting portion 600, and a control unit 500. Under control of the control unit 500, the three-dimensional shaping device 100 ejects a shaping material MM described later from an ejection unit 60 provided in the shaping unit 200 to the table 300, and drives the shaping unit 200 or the moving mechanism 400 to change a relative position between the ejection unit 60 and the table 300, thereby shaping a three-dimensional shaped object having a desired shape on a shaping surface 311 of the table 300. The shaping surface 311 is an example of an ejection target surface to which the shaping material MM is ejected from a nozzle 61.

If necessary, during the shaping of the three-dimensional shaped object, or after the shaping of the three-dimensional shaped object, the three-dimensional shaping device 100 drives and controls the cutting portion 600 under the control of the control unit 500 to cut the three-dimensional shaped object. A detailed configuration of the shaping unit 200 will be described later.

The moving mechanism 400 changes a relative position between the ejection unit 60 and the shaping surface 311. For example, the moving mechanism 400 moves the table 300 with respect to the shaping unit 200 to change the relative position between the ejection unit 60 and the shaping surface 311. The change in the relative position of the ejection unit 60 with respect to the shaping surface 311 may be referred to as movement of the ejection unit 60. A relative moving speed of the ejection unit 60 with respect to the shaping surface 311 may be referred to as a moving speed of the ejection unit 60. In the present embodiment, for example, movement of the table 300 in a +X direction can be rephrased as the movement of the ejection unit 60 in a –X direction.

The moving mechanism 400 includes a three-axis positioner that moves the table 300 in the directions of the three axes of the X, Y, and Z directions by drive forces of three motors. Each of the motors is driven under the control of the control unit 500. The moving mechanism 400 may move the shaping unit 200, instead of moving the table 300, to change the relative position between the ejection unit 60 and the shaping surface 311. The moving mechanism 400 of the present embodiment may move both the table 300 and the shaping unit 200 to change the relative position between the ejection unit 60 and the shaping surface 311.

The cutting portion 600 cuts the three-dimensional shaped object formed of the shaping material MM ejected to the shaping surface 311. The cutting portion 600 can cut the shaping material MM ejected to the shaping surface 311. The cutting portion 600 includes a holding arm 602 for holding a cutting tool 603, and a cutting drive portion 601. The holding arm 602 holds the cutting tool 603 movably in the directions of the three axes of the X, Y, and Z directions. The cutting drive portion 601 drives movement of the holding arm 602 and cutting of the cutting tool 603. The cutting portion 600 cuts the three-dimensional shaped object into a desired shape under the control of the control unit 500 over the cutting drive portion 601.

The control unit 500 is configured with a computer including one or more processors, a storage device, and an input or output portion that inputs or outputs a signal to or from an outside. In the present embodiment, the control unit 500 controls operations of the shaping unit 200 and the moving mechanism 400 by causing the processor to execute a program or a command read into the storage device, thereby executing shaping processing for shaping the three-dimensional shaped object. The operations include changing a three-dimensional relative position between the shaping unit 200 and the table 300. The control unit 500 may be configured with a combination of a plurality of circuits instead of the computer.

The shaping unit 200 includes a material supply portion 20 which is a supply source of a material MR, a plasticization unit 30 that plasticizes at least a part of the material MR supplied from the material supply portion 20 to form the shaping material MM, an ejection unit 60 that includes a nozzle 61 that ejects the shaping material MM supplied from the plasticization unit 30, an ejection amount adjusting mechanism 70 that adjusts a flow rate of the shaping material MM ejected from the nozzle 61, an aspiration unit 80, a heating unit 120, and a compression unit 150.

The material supply portion 20 accommodates the material MR (not shown) in a state of a pellet, powder, or the like. In the present embodiment, for example, a thermoplastic resin formed in a pellet shape is used as the material MR. The material supply portion 20 according to the present embodiment is a hopper. A coupling path 22 coupling the material supply portion 20 and the plasticization unit 30 is provided below the material supply portion 20. The material supply portion 20 supplies the material MR to the plasticization unit 30 via the coupling path 22. Details of the material MR will be described later.

The plasticization unit 30 includes a screw case 31, a drive motor 32, a flat screw 40, and a barrel 50. The flat screw 40 is an example of a screw. The plasticization unit 30 plasticizes the material MR in a solid state supplied from the material supply portion 20 to produce the paste-shaped shaping material MM (not shown) exhibiting fluidity, and supplies the shaping material MM to the ejection unit 60. The shaping material MM may be referred to as a molten material.

In the present embodiment, "plasticization" means that heat is applied to the material MR having thermoplasticity to melt the material MR. In addition, "melt" means not only that the material MR having the thermoplasticity is heated to a temperature equal to or higher than a melting point to become liquid, but also that the material MR having the thermoplasticity is heated to a temperature equal to or higher than a glass transition point to be softened and exhibits the fluidity.

The screw case 31 is a housing for accommodating the flat screw 40. The barrel 50 is fixed to a lower surface of the screw case 31, and the flat screw 40 is accommodated in a space surrounded by the screw case 31 and the barrel 50. A drive motor 32 is fixed to an upper surface of the screw case 31. A rotation shaft of the drive motor 32 is coupled to an upper surface 41 side of the flat screw 40. The drive motor 32 is driven under the control of the control unit 500.

The flat screw 40 has a substantially cylindrical shape in which a height in a direction along a central axis RX is smaller than a diameter. The flat screw 40 is disposed in the screw case 31 such that the central axis RX is parallel to the Z-axis. The flat screw 40 rotates about the central axis RX in the screw case 31 by a torque generated by the drive motor 32. The flat screw 40 includes a groove forming surface 42, in which grooves 45 are formed, on an opposite side of the upper surface 41 in the direction along the central axis RX.

Figure 2:
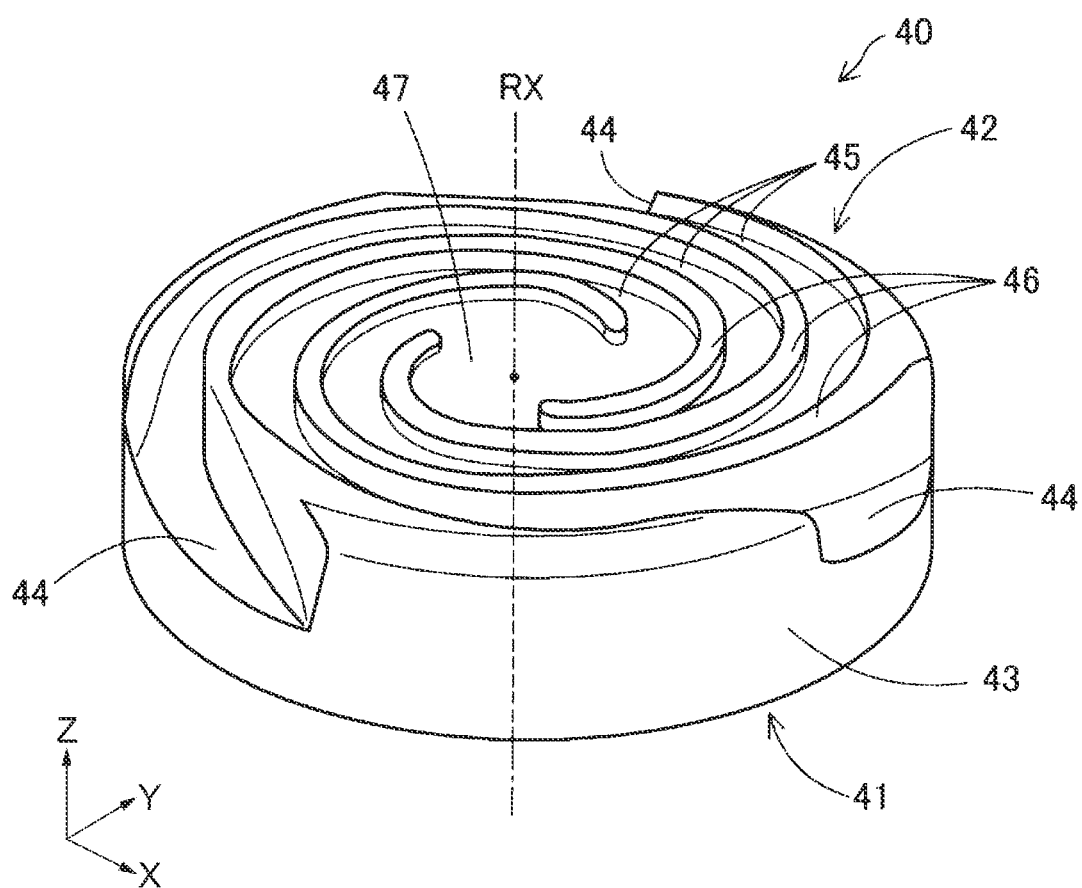
FIG. 2 is a schematic perspective view illustrating a configuration of a groove forming surface side of a flat screw.

As illustrated in FIG. 2, a central portion 47 of the groove forming surface 42 of the flat screw 40 is a recess to which one end of each of the grooves 45 is coupled. In FIG. 2, a position of the center axis RX of the flat screw 40 is indicated by a dash-dotted line. The central portion 47 faces a communication hole 56 of the barrel 50 illustrated in FIG. 1. The central portion 47 intersects the central axis RX.

The grooves 45 of the flat screw 40 are so-called scroll grooves. The grooves 45 extend in a vortex shape from the central portion 47 in a manner of drawing arcs toward an outer periphery of the flat screw 40. The grooves 45 may extend in a spiral shape. The groove forming surface 42 is provided with ridges 46 that constitute side walls of the grooves 45 and extend along the grooves 45.

The grooves 45 are continuous to material introduction ports 44 formed in a side surface 43 of the flat screw 40. Each of the material introduction ports 44 is a portion that receives the material MR supplied via the coupling path 22 of the material supply portion 20.

FIG. 2 illustrates an example of the flat screw 40 including three grooves 45 and three ridges 46. The number of the grooves 45 and the ridges 46 provided in the flat screw 40 is not limited to three. The flat screw 40 may be provided with only one groove 45, or may be provided with two or more grooves 45. Any number of the ridges 46 may be provided in accordance with the number of the grooves 45.

FIG. 2 illustrates the example of the flat screw 40 provided with the material introduction ports 44 at three positions. The number of the material introduction ports 44 provided in the flat screw 40 is not limited to three. The flat screw 40 may be provided with only one material introduction port 44, or may be provided with two or more material introduction ports 44.

The barrel 50 is disposed below the flat screw 40. The barrel 50 includes a screw facing surface 52 facing the groove forming surface 42 of the flat screw 40. The barrel 50 is provided with the communication hole 56 communicating with the ejection unit 60 on the central axis RX of the flat screw 40. The barrel 50 includes a built-in plasticization unit heater 58 at a position facing the grooves 45 of the flat screw 40. A temperature of the plasticization unit heater 58 is controlled by the control unit 500.

Figure 3:
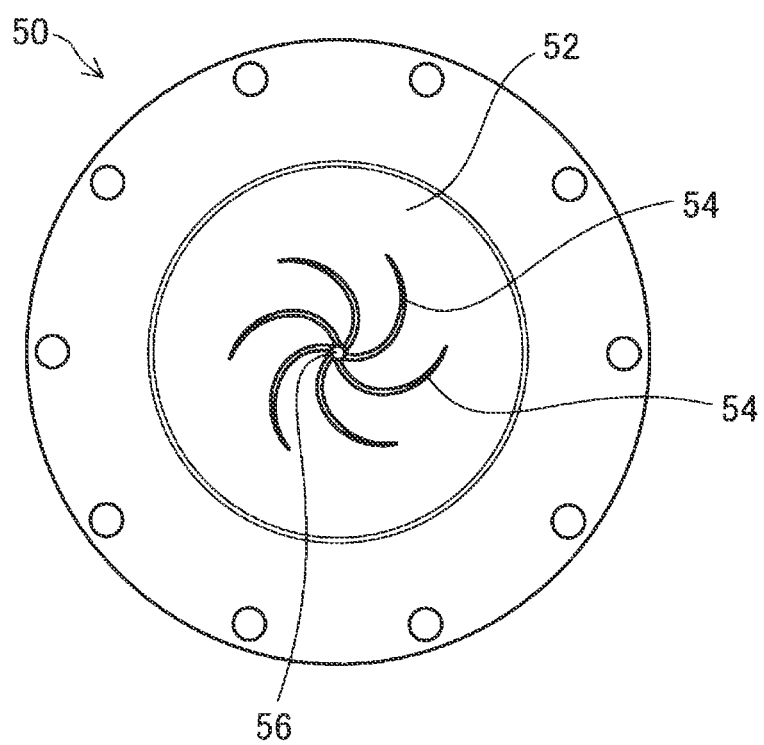
FIG. 3 is a top view illustrating a configuration of a screw facing surface side of a barrel.
Figure 3:
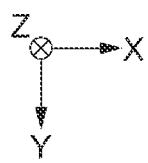

As illustrated in FIG. 3, a plurality of guide grooves 54 are formed around the communication hole 56 in the screw facing surface 52. Each of the guide grooves 54 has one end coupled to the communication hole 56 and extends in a vortex shape from the communication hole 56 toward an outer periphery of the screw facing surface 52. Each of the guide grooves 54 has a function of guiding the shaping material MM to the communication hole 56.

In the three-dimensional shaping device 100, as described above, the plasticization unit 30 plasticizes the material MR in the solid state supplied to the grooves 45 of the rotating flat screw 40 to produce the shaping material MM, and supplies the shaping material MM to the ejection unit 60. An amount of the shaping material MM supplied to the ejection unit 60 per unit time may be changed by adjusting the number of rotations per unit time of the flat screw 40. For example, the amount of the shaping material MM supplied to the ejection unit 60 per unit time increases as the number of rotations per unit time of the flat screw 40 increases.

The ejection unit 60 is fixed to a lower surface of the barrel 50. The ejection unit 60 includes a supply flow path 62 and the nozzle 61. The supply flow path 62 connects the plasticization unit 30 and the nozzle 61, and supplies the shaping material MM from the plasticization unit 30 to the nozzle 61.

The supply flow path 62 includes a first supply port 65, an intersecting hole 66, and a second supply port 67. The first supply port 65 and the second supply port 67 extend in the Z-axis direction. The intersecting hole 66 extends in the Y-axis direction intersecting with the first supply port 65 and the second supply port 67. An upper end of the first supply port 65 is coupled to the communication hole 56 of the barrel 50, and a lower end of the first supply port 65 is coupled to the intersecting hole 66. An upper end of the second supply port 67 is coupled to the intersecting hole 66, and a lower end of the second supply port 67 is coupled to the nozzle 61. The ejection amount adjusting mechanism 70 described later is accommodated in the intersecting hole 66. The shaping material MM supplied from the communication hole 56 of the barrel 50 to the first supply port 65 flows in an order of the intersecting hole 66, the second supply port 67, and the nozzle 61.

Figure 4:
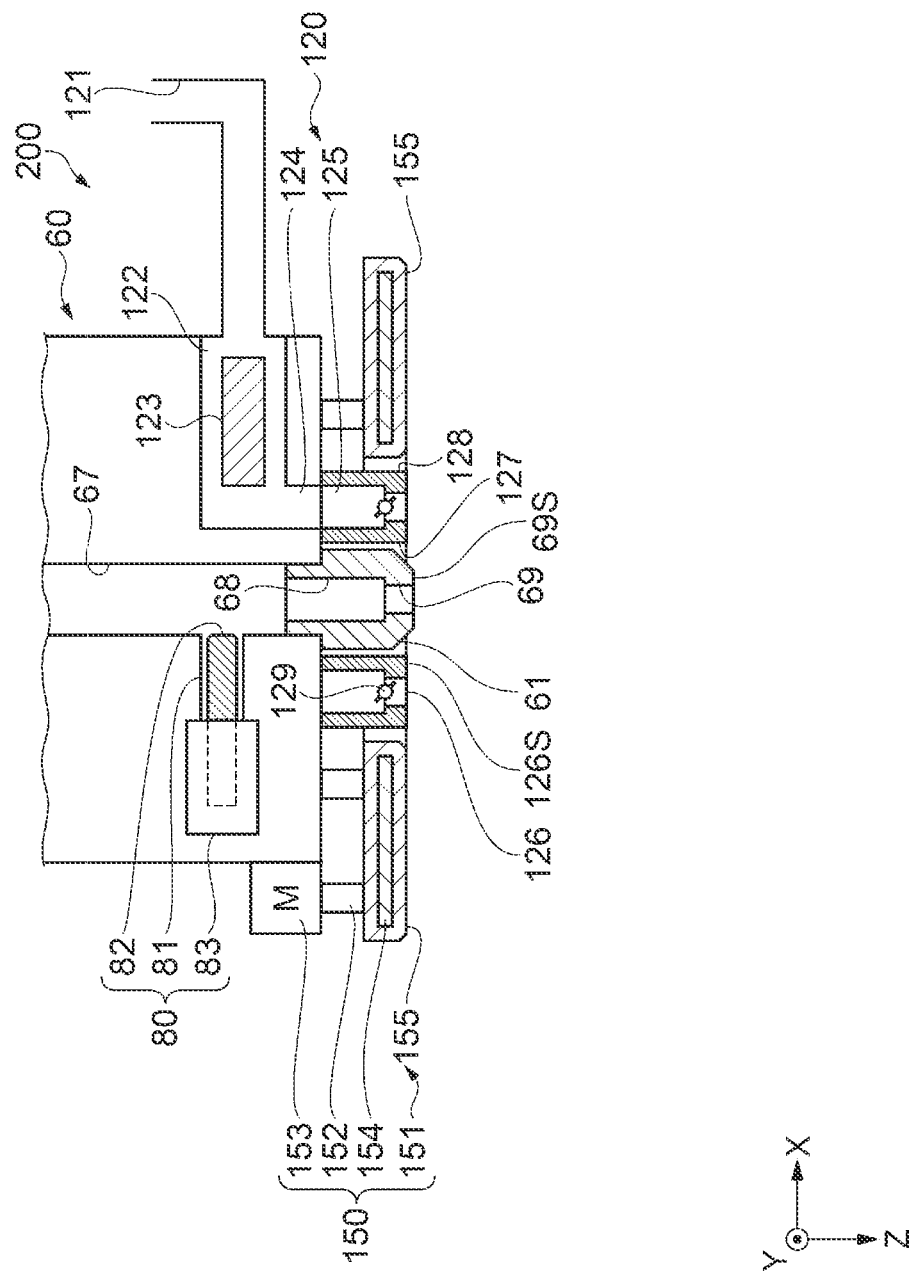
FIG. 4 is a schematic diagram schematically illustrating configurations of a heating unit and a compressing unit.
Figure 6:
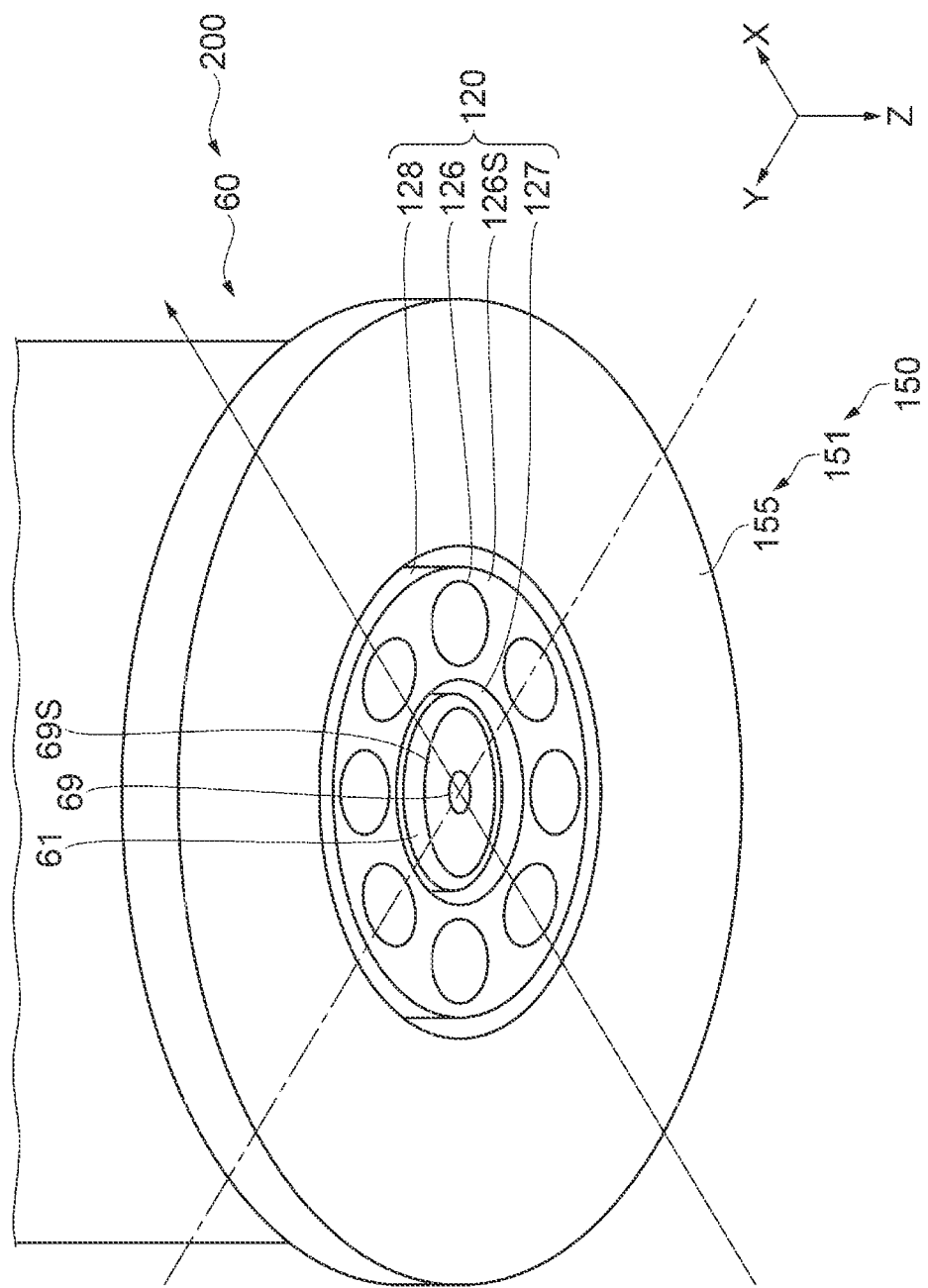
FIG. 6 is a schematic perspective view illustrating the configurations of the heating unit and the compressing unit.

The nozzle 61 is provided with a nozzle flow path 68 and the nozzle hole 69. The nozzle flow path 68 is a flow path provided in the nozzle 61. The nozzle flow path 68 is coupled to the second supply port 67. The nozzle hole 69 is a portion in which a flow path cross section provided at an end of the nozzle flow path 68 on a side communicating with atmosphere is reduced. The shaping material MM supplied from the second supply port 67 to the nozzle flow path 68 is ejected from the nozzle hole 69. As illustrated in FIGS. 4 and 6, the nozzle hole 69 includes a nozzle tip surface 69S of the nozzle 61. In the present embodiment, an opening shape of the nozzle hole 69 is circular. The opening shape of the nozzle hole 69 is not limited to a circular shape, and may be, for example, a quadrangular shape or a polygonal shape other than the quadrangular shape.

The ejection amount adjusting mechanism 70 is provided in the supply flow path 62, and adjusts an amount of the shaping material MM ejected from the nozzle 61. The amount of the shaping material MM ejected from the nozzle 61 per unit time may be referred to as an ejection amount. The ejection amount adjusting mechanism 70 in the present embodiment is a butterfly valve. The ejection amount adjusting mechanism 70 includes a drive shaft 71, which is a shaft-shaped member, and a plate-shaped valve body 72, which rotates together with rotation of the drive shaft 71. The drive shaft 71 is inserted into the intersecting hole 66 such that a direction along a central axis of the drive shaft 71 intersects with a flow direction of the shaping material MM in the supply flow path 62.

The ejection amount adjusting mechanism 70 functions as a flow rate adjusting mechanism that adjusts the flow rate of the shaping material MM flowing in the supply flow path 62. Specifically, the ejection amount adjusting mechanism 70 changes a rotation angle of the valve body 72 to adjust ease of flow of the shaping material MM flowing in the supply flow path 62, thereby adjusting the flow rate of the shaping material MM flowing in the supply flow path 62. The ejection amount is adjusted by adjusting the flow rate of the shaping material MM flowing in the supply flow path 62. The valve body 72 is an example of an adjustment valve.

Increasing the ejection amount by controlling the ejection amount adjusting mechanism 70 may be referred to as opening the ejection amount adjusting mechanism 70. Reducing the ejection amount by controlling the ejection amount adjusting mechanism 70 may be referred to as closing the ejection amount adjusting mechanism 70. A degree of rotation of the valve body 72 may be referred to as an opening degree. When a plate-shaped surface of the valve body 72 is perpendicular to the flow direction of the shaping material MM in the supply flow path 62 by the rotation of the drive shaft 71, the opening degree is 0, the plasticization unit 30 does not communicate with the nozzle 61, and the ejection of the shaping material MM from the nozzle 61 is stopped. When the plate-shaped surface of the valve body 72 is parallel to the flow direction of the shaping material MM in the supply flow path 62, the opening degree is 100, the plasticization unit 30 communicates with the nozzle 61, and the shaping material MM is ejected. In this manner, the ejection amount adjusting mechanism 70 also controls the start and stop of the ejection of the shaping material MM from the nozzle 61.

The aspiration unit 80 is configured to aspirate the shaping material MM in the supply flow path 62. The aspiration unit 80 aspirates the shaping material MM in the supply flow path 62 to reduce a residual pressure in the supply flow path 62 after the valve body 72 of the ejection amount adjusting mechanism 70 is closed, and to prevent leakage of the shaping material MM from the nozzle 61 in which the ejection of the shaping material MM is stopped. The aspiration unit 80 includes a cylindrical cylinder 81, a plunger 82 which is accommodated in the cylinder 81, and a plunger drive portion 83 which drives the plunger 82. The cylinder 81 is coupled to a position between the valve body 72 in the supply flow path 62 and the nozzle hole 69.

In the present embodiment, the plunger drive portion 83 includes a motor that is driven under the control of the control unit 500, and a rack and pinion that converts rotation of the motor into movement in a translation direction along the X-axis which is an axial direction of the cylinder 81. The plunger drive portion 83 may include a motor that is driven under the control of the control unit 500, and a ball screw that converts the rotation of the motor into the movement in the translation direction along the axial direction of the cylinder 81, or may include an actuator such as a solenoid mechanism or a piezoelectric element.

When the plunger 82 moves in the −X direction away from the supply flow path 62, a pressure in the cylinder 81 becomes negative, and thus the shaping material MM in a region between the valve body 72 in the supply flow path 62 and the nozzle hole 69 is aspirated toward the inside of the cylinder 81. Meanwhile, when the plunger 82 moves in the +X direction approaching the supply flow path 62, the shaping material MM in the cylinder 81 is extruded into the supply flow path 62 by the plunger 82.

Figure 5:
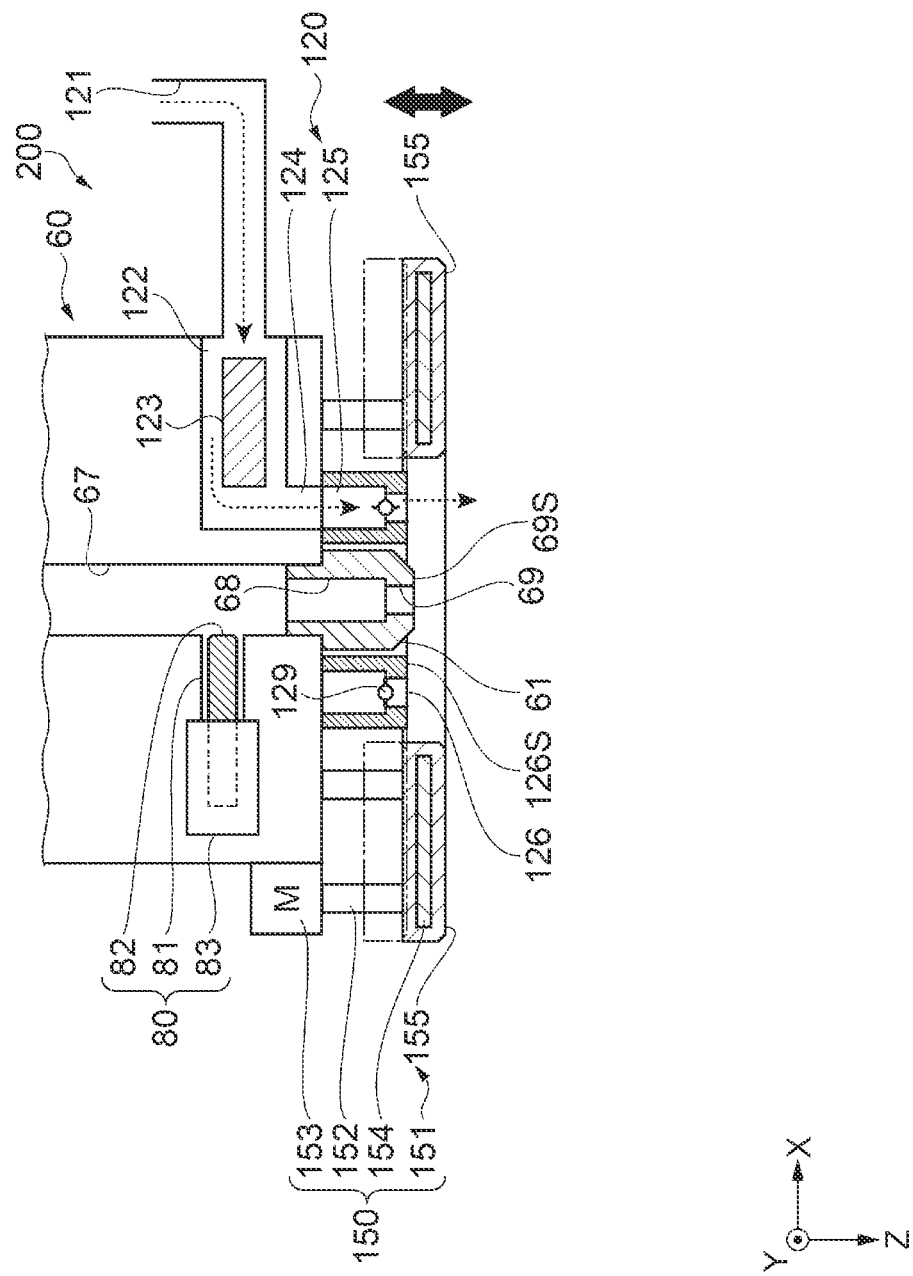
FIG. 5 is a schematic diagram schematically illustrating the configurations of the heating unit and the compressing unit.
Figure 7:
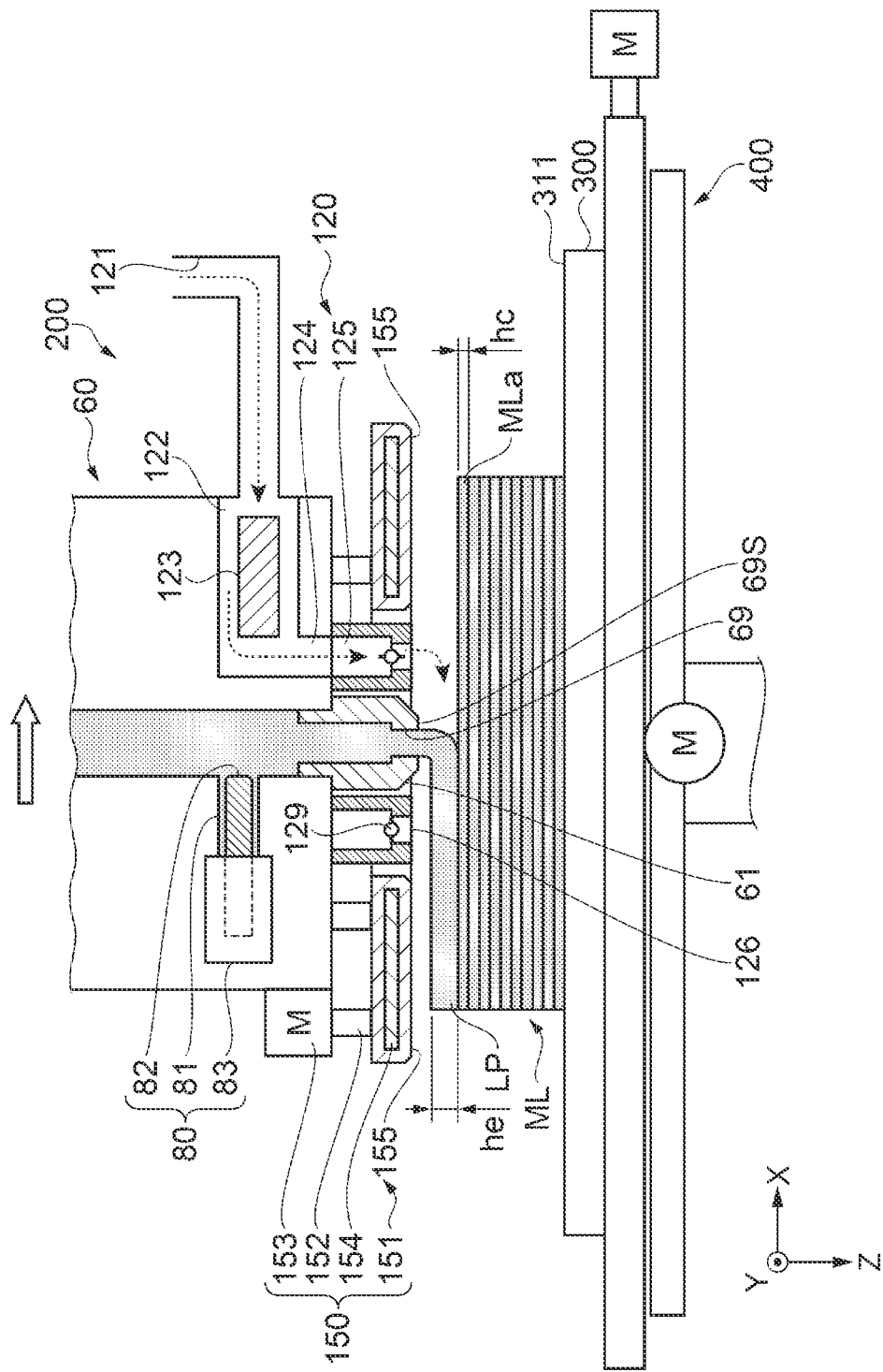
FIG. 7 is a schematic diagram schematically illustrating a manner of ejecting a shaping material from a nozzle to shape a three-dimensional shaped object.

As illustrated in FIG. 7, the heating unit 120 heats an uppermost layer MLa on the shaping surface 311. The uppermost layer MLa will be described later, and the uppermost layer MLa is a layer located on a most −Z direction side among layers MLs formed by the shaping material MM ejected from the nozzle 61. As illustrated in FIG. 1, the heating unit 120 is disposed at a +Z direction side with respect to the ejection amount adjusting mechanism 70 in the ejection unit 60. As illustrated in FIGS. 1, 4, and 5, the heating unit 120 includes an introduction flow path 121, a hot air generation portion 122, a hot air supply flow path 124, an annular flow path 125, and air outlets 126.

The introduction flow path 121 is a cylindrical tube. One end of the introduction flow path 121 is provided with an introduction opening for introducing a gas into the introduction flow path 121. An end, opposite to the introduction opening, of the introduction flow path 121 is coupled to the hot air generation portion 122. Although not shown, in the present embodiment, air subjected to flow rate adjustment is introduced into the introduction flow path 121 as illustrated by a broken line in FIG. 5. For example, an air pump can be used for introducing the air into the introduction flow path 121. The gas introduced into the introduction flow path 121 may be another inert gas instead of the air. For example, the gas introduced into the introduction flow path 121 may be nitrogen.

The hot air generation portion 122 heats the gas introduced from the introduction flow path 121. The hot air generation portion 122 is provided with a heat generation portion 123. The heat generation portion 123 is, for example, a coiled heating wire. The air introduced into the hot air generation portion 122 is heated by the heat generation portion 123 and flows to the annular flow path 125 via the hot air supply flow path 124 as illustrated by the broken line in FIG. 5.

The annular flow path 125 is an annular flow path formed around the nozzle hole 69 of the nozzle 61 and formed along an outer peripheral portion 128 illustrated in FIGS. 4 and 6. The annular flow path 125 is coupled to the hot air supply flow path 124 at an upper part of the flow path located on a −Z direction side. As illustrated by the broken line in FIG. 5, the annular flow path 125 supplies the hot air supplied from the hot air supply flow path 124 to the air outlets 126 communicating with the annular flow path 125.

A gap is provided between the nozzle 61 and an inner peripheral portion 127 of the annular flow path 125. The inner peripheral portion 127 isolates the nozzle 61 and the annular flow path 125, and the air existing in the gap between the nozzle 61 and the inner peripheral portion 127 insulates the nozzle 61 and the annular flow path 125. Glass wool or the like may be fixed as a heat insulating material in the gap between the nozzle 61 and the inner peripheral portion 127.

A heating surface 126S where the air outlets 126 are opened has a shape surrounding the nozzle 61 when viewed from a direction along the Z-axis direction. The air outlets 126 are arranged around the nozzle 61. As illustrated in FIG. 6, in the present embodiment, eight air outlets 126 are arranged at regular intervals on a circumference whose center is the nozzle 61. In FIGS. 4 and 5, the air outlet 126 located on a +X direction side of the nozzle 61 is the air outlet 126 located on a most +X direction side among the eight air outlets 126, and the air outlet 126 located on a −X direction side of the nozzle 61 is the air outlet 126 located on a most −X direction side among the eight air outlets 126. As illustrated by the broken line in FIG. 5, the air outlets 126 blow the hot air supplied from the annular flow path 125 to a +Z direction side of the heating surface 126S, and as illustrated in FIG. 7, the air outlets 126 blow the hot air toward the uppermost layer MLa on the shaping surface 311.

As illustrated in FIGS. 4 and 5, each of the air outlets 126 is provided with a control valve 129. The control valve 129 is a butterfly valve having a disk-shaped valve portion and a rotation shaft. The air outlets 126 are opened and closed by rotation of the control valves 129, and a blowing amount of the hot air blown from the air outlets 126 is adjusted. The control valves 129 are controlled separately by the control unit 500. That is, each of the control valves 129 functions as a blowing amount adjusting mechanism capable of adjusting the blowing amount for each of the air outlets 126.

When the control valve 129 of the air outlet 126 located on the −X direction side of the nozzle 61 illustrated in FIG. 5 is in a horizontal posture parallel to the X-axis, the blowing amount becomes 0, which is the minimum. When the control valve 129 of the air outlet 126 located on the +X direction side of the nozzle 61 illustrated in FIG. 5 is in a vertical posture parallel to the Z-axis, the blowing amount becomes the maximum. In another embodiment, the blowing amount adjusting mechanism may be, for example, a shutter that opens and closes the air outlets 126 with one or a plurality of plate-shaped members.

The compression unit 150 compresses the shaping material MM ejected from the nozzle 61 to the uppermost layer MLa described later. Accordingly, voids in the shaping material MM ejected to the uppermost layer MLa, gaps generated between the shaping material MM ejected to the uppermost layer MLa and the uppermost layer MLa, gaps generated between the shaping materials MM ejected to the uppermost layer MLa, and the like can be reduced. As illustrated in FIG. 1, the compression unit 150 is fixed at a position on the +Z direction side with respect to the ejection amount adjusting mechanism 70 in the ejection unit 60. As illustrated in FIGS. 1, 4, and 5, the compression unit 150 includes a compressing member 151 and a compression unit moving mechanism 152.

Figure 8:
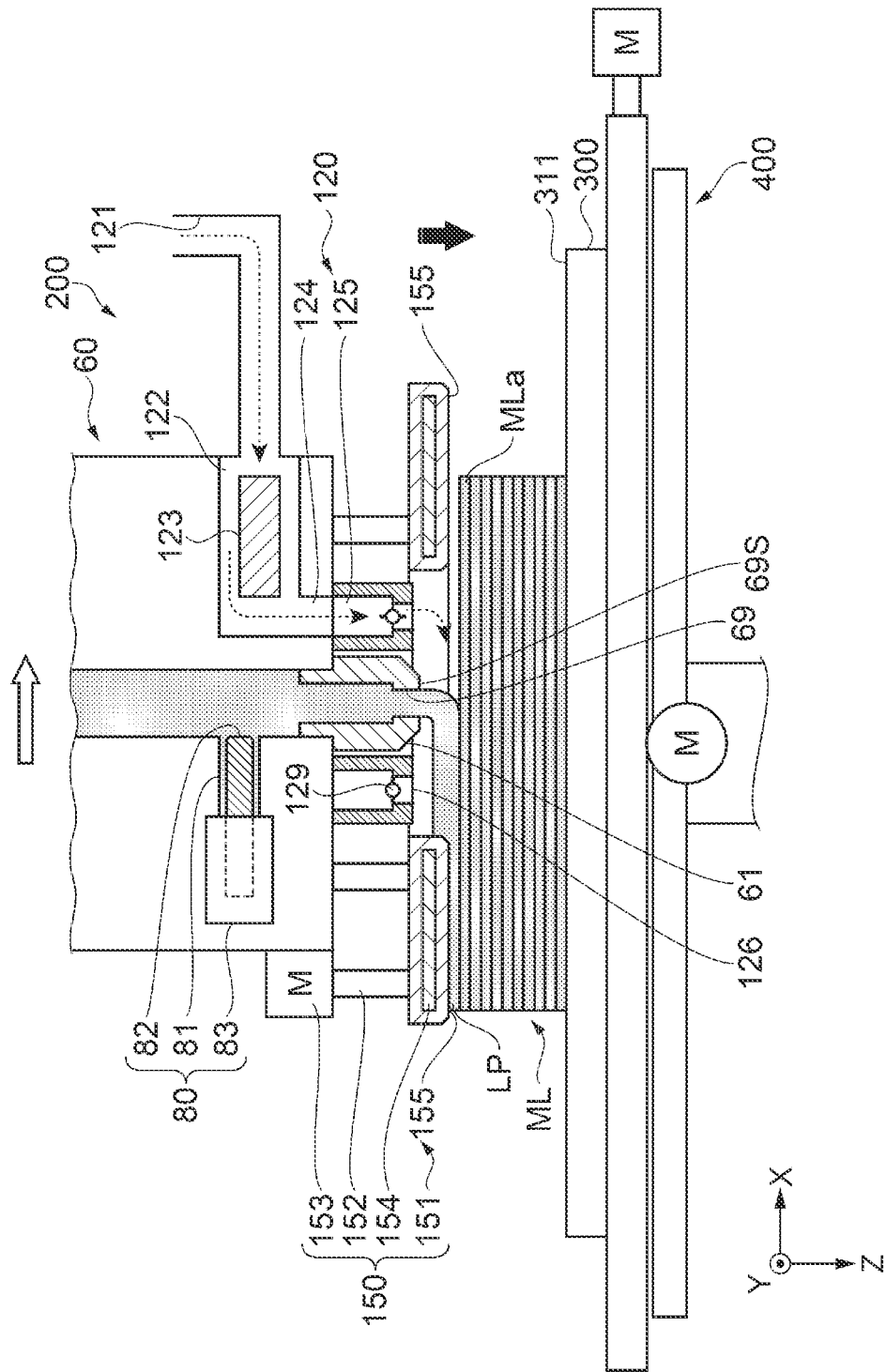
FIG. 8 is a schematic diagram schematically illustrating a manner of compressing the ejected shaping material by the compressing unit.

As illustrated in FIG. 8, the contact surface 155 is in contact with a linear shaped object LP on the uppermost layer MLa, so that the compression unit 150 applies a pressure to the linear shaped object LP located between the uppermost layer MLa and the contact surface 155 to compress the linear shaped object LP. The linear shaped object LP is an example of the shaping material MM ejected from the nozzle 61 to the ejection target surface. As illustrated in FIG. 6, the contact surface 155, which is a surface of the compressing member 151 at the +Z direction side, has a shape surrounding the heating surface 126S of the heating unit 120. Therefore, the contact surface 155 has a shape surrounding the nozzle 61 and the heating surface 126S when viewed from the direction along the Z-axis direction. Accordingly, when the shaping material MM is ejected to the uppermost layer MLa while the nozzle 61 is moved, even though a moving direction in the movement of the nozzle 61 along the uppermost layer MLa is changed, it is unnecessary to move the compressing member 151 according to the moving direction, and thus the shaping material MM can be easily compressed.

As illustrated in FIGS. 4 and 5, the compressing member 151 is provided with a heater 154 capable of adjusting a temperature of the contact surface 155. The heater 154 of the present embodiment is provided inside the compressing member 151. The heater 154 can be adopted as long as the temperature of the contact surface 155 can be adjusted, and a ceramic heater, a sheathed heater, a carbon heater, or the like can be adopted. The heater 154 may be provided at a surface of the compressing member 151 on the −Z direction side as long as the temperature of the contact surface 155 can be adjusted.

For example, the heater 154 is controlled by the control unit 500 to raise the temperature of the contact surface 155, so that a temperature drop, particularly a sudden temperature drop of the shaping material MM due to contact of the contact surface 155 with the shaping material MM ejected to the ejection target surface can be prevented. In a state where the temperature of the contact surface 155 is higher than a temperature of the shaping material MM ejected to the uppermost layer MLa, when the contact surface 155 comes into contact with the shaping material MM, the shaping material MM may adhere to the contact surface 155 and become a stringing state. Therefore, when the contact surface 155 comes into contact with the shaping material MM ejected to the uppermost layer MLa, the temperature of the contact surface 155 is set lower than the temperature of the shaping material MM ejected to the uppermost layer MLa.

The compression unit moving mechanism 152 holds the compressing member 151 movably in the Z-axis direction. The compression unit moving mechanism 152 includes a compression unit motor 153. The compression unit moving mechanism 152 is configured with an eccentric cam mechanism that converts rotation of the compression unit motor 153 driven under the control of the control unit 500 into translational movement along the Z-axis direction. The compression unit moving mechanism 152 may be configured with a ball screw or a link mechanism that converts the rotation of the compression unit motor 153 into the translational movement along the Z-axis direction, or may be configured with an actuator such as a solenoid mechanism or a piezoelectric element.

Figure 9:
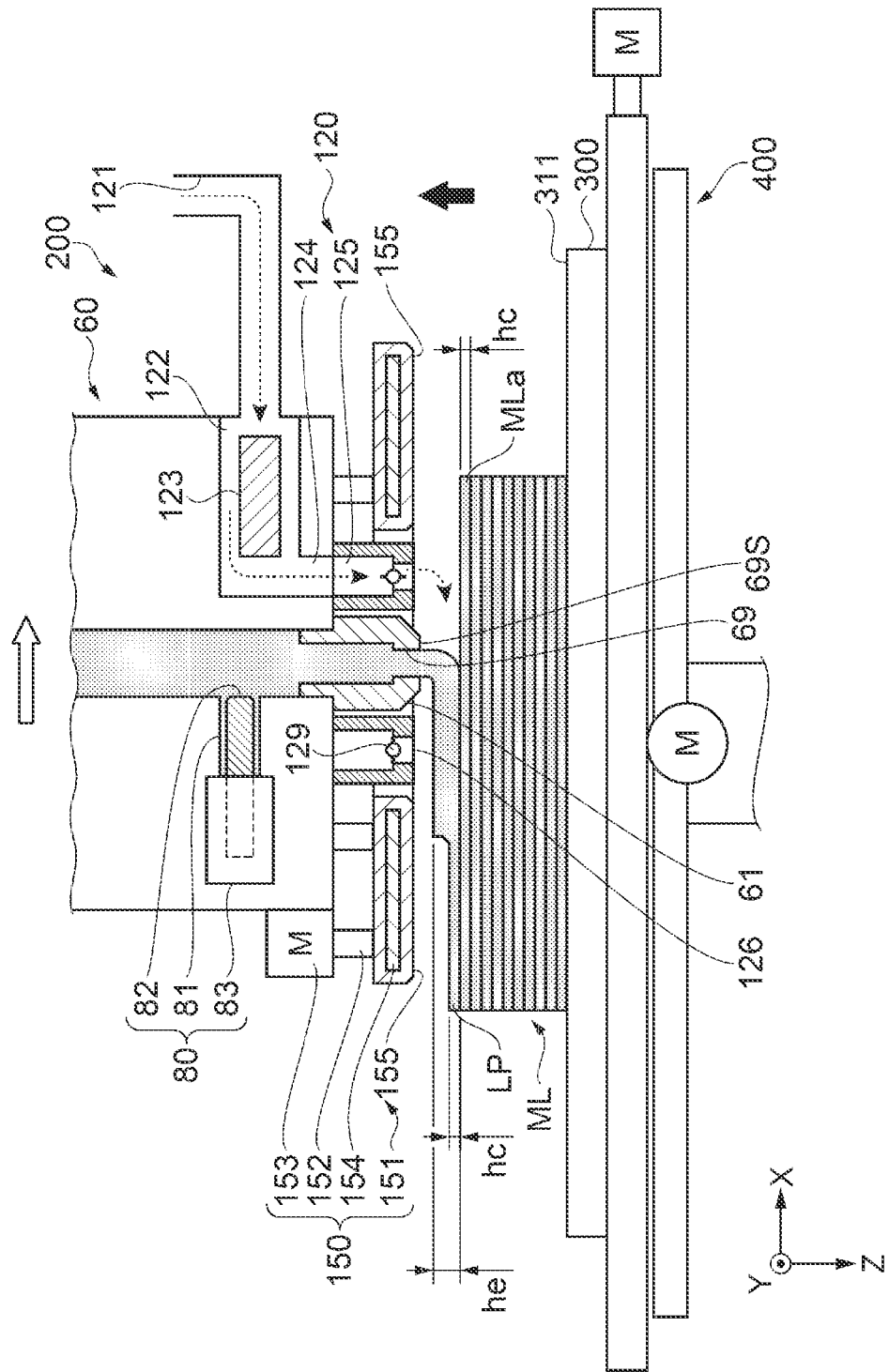
FIG. 9 is a schematic view schematically illustrating a manner of separating the compression unit from the ejected shaping material.
Figure 10:
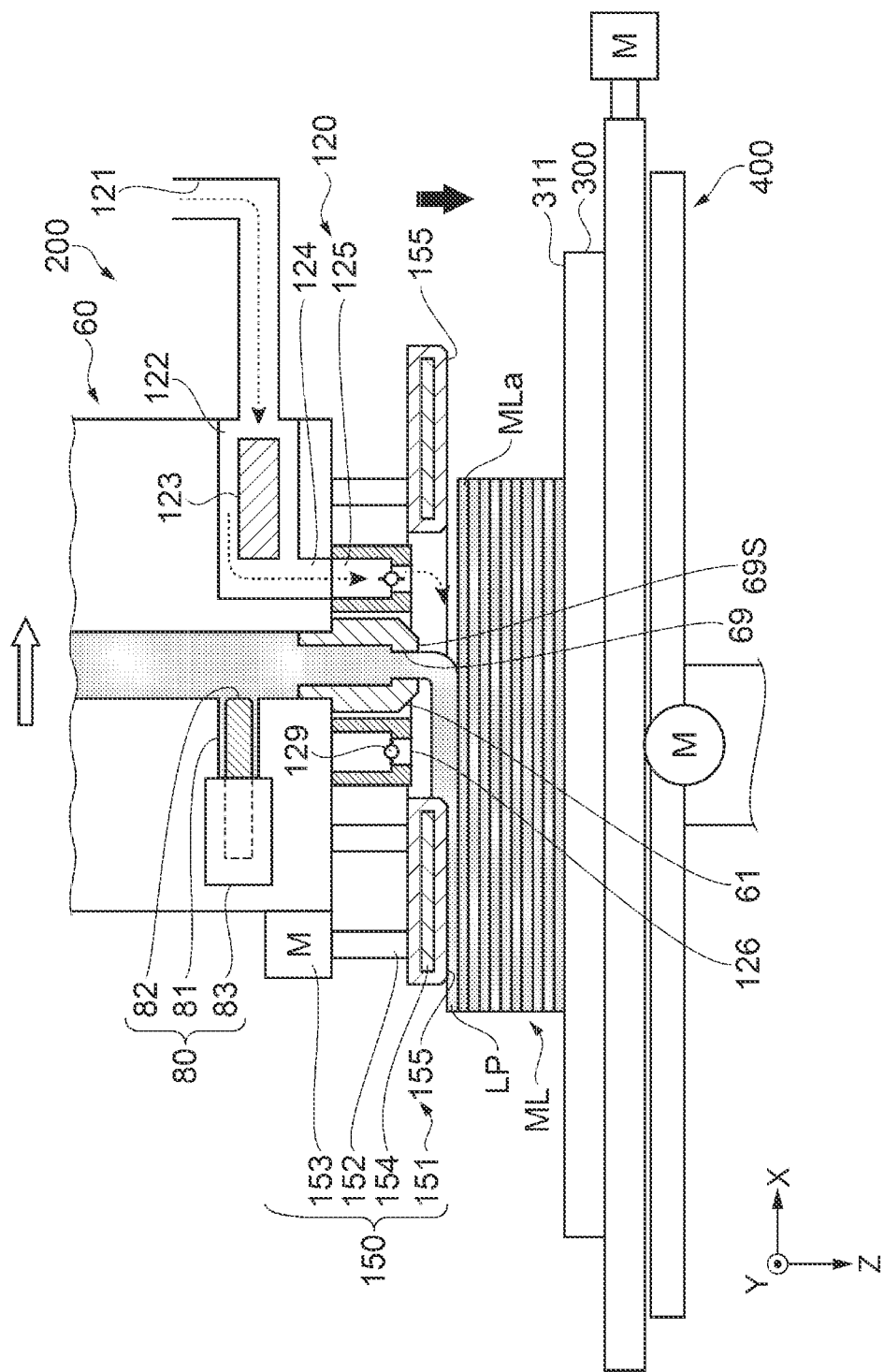
FIG. 10 is a schematic diagram schematically illustrating a manner of repeatedly compressing the shaping material by the compressing unit.
Figure 11:
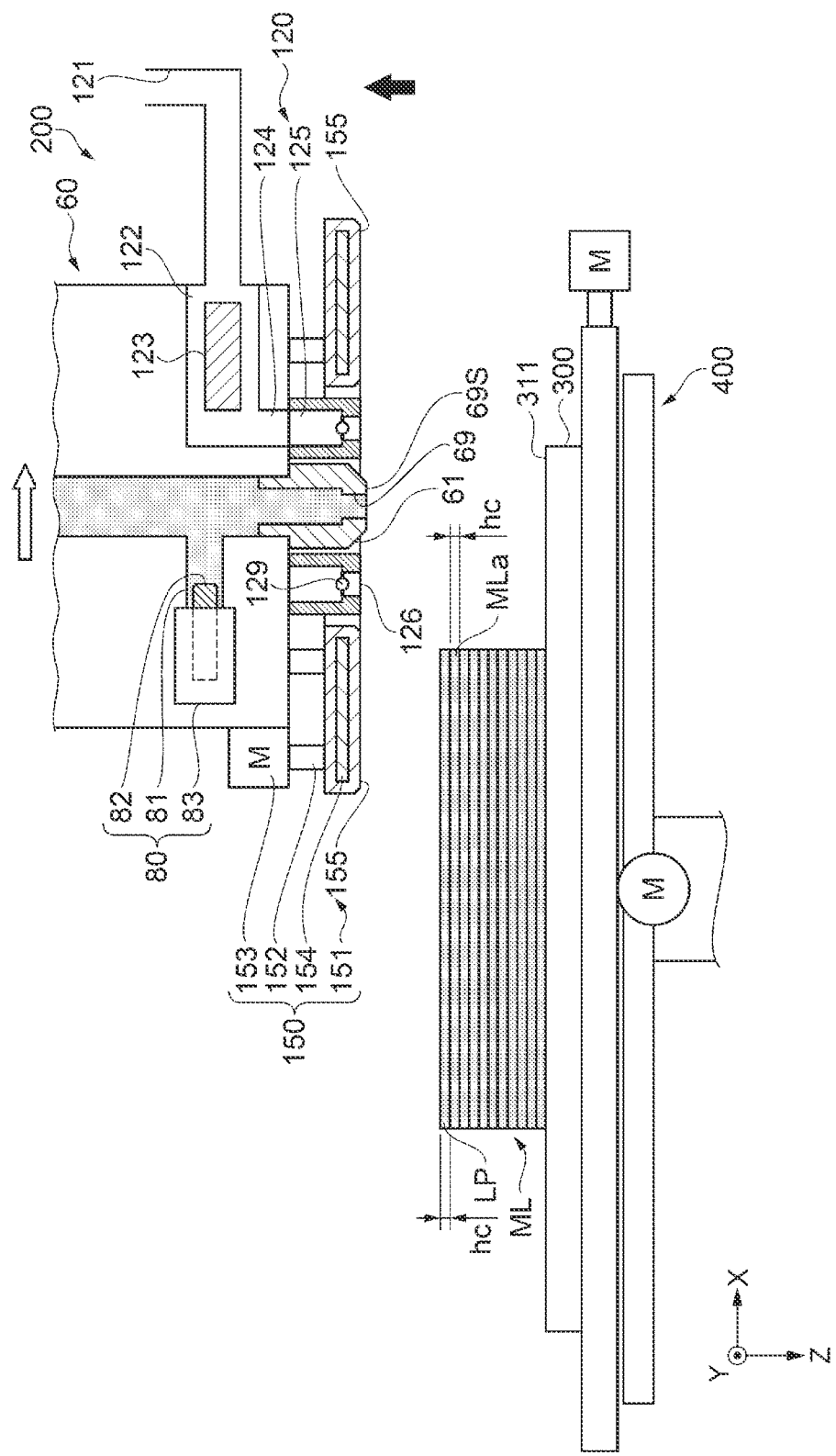
FIG. 11 is a schematic diagram schematically illustrating a manner of ending the ejection of the shaping material.

The compression unit moving mechanism 152 moves the compressing member 151 to a contact position illustrated in FIG. 5 and a separation position illustrated in FIG. 4 by moving the compressing member 151 in the Z-axis direction. In FIG. 5, the compressing member 151 at the separation position is illustrated by a two-dot chain line. As illustrated in FIGS. 8 and 10, the contact position is a position where the contact surface 155 of the compressing member 151 is in contact with the linear shaped object LP on the uppermost layer MLa. As illustrated in FIGS. 7, 9, and 11, the separation position is a position where the contact surface 155 of the compressing member 151 is separated from the linear shaped object LP on the uppermost layer MLa.

A distance, in the Z-axis direction, between the contact surface 155 and the uppermost layer MLa at the contact position can be changed. Accordingly, for example, a degree of compression of the shaping material MM can be changed according to a type of the shaping material MM. In this case, for example, the degree of the compression of the shaping material MM when the shaping material MM is an ABS resin may be higher than that when the shaping material MM is a PPS resin. For example, the degree of the compression of the shaping material MM when the shaping material MM is an ABS resin to which glass fiber is added may be lower than that when the shaping material MM is the ABS resin. As illustrated in FIGS. 8 and 10, the contact surface 155 is located at an uppermost layer MLa side, which is the +Z direction side of the nozzle 61, when the shaping material MM is compressed at the contact position.

As illustrated in FIG. 7, the control unit 500 of the three-dimensional shaping device 100 causes the nozzle 61 of the ejection unit 60 to eject the shaping material MM to the uppermost layer MLa while moving the ejection unit 60. Specifically, the control unit 500 maintains a distance between the uppermost layer MLa and the nozzle 61, and causes the nozzle 61 to eject the shaping material MM while moving the nozzle 61 along the uppermost layer MLa in the +X direction. A direction along the uppermost layer MLa is a direction along the shaping surface 311. The shaping material MM ejected from the nozzle 61 is continuously deposited in a moving direction of the nozzle 61. Accordingly, the linear shaped object LP extending linearly along a moving path of the nozzle 61 is shaped. As described above, the linear shaped object LP is an example of the shaping material MM ejected to the uppermost layer MLa. Moving the nozzle 61 while ejecting the shaping material MM may be referred to as scanning. A direction of the scanning of the nozzle 61 may be referred to as a scanning direction. The direction along the uppermost layer MLa is a direction along the ejection target surface, and can be rephrased as the direction along the shaping surface 311.

The control unit 500 forms the layers MLs by repeating the scanning performed by the nozzle 61. For example, the control unit 500 moves the shaping unit 200 including the nozzle 61 in the −Z direction after forming the uppermost layer MLa located at the most −Z direction side of the laminated layers MLs. Then, the control unit 500 forms the linear shaped object LP on the uppermost layer MLa, and further laminates the layers MLs to shape a three-dimensional shaped object. In other words, the three-dimensional shaping device 100 shapes a three-dimensional shaped object by ejecting the shaping material MM to the ejection target surface and laminating the layers MLs in a laminating direction. In this case, the uppermost layer MLa is the layer ML to which the shaping material MM for shaping the linear shaped object LP is ejected. The uppermost layer MLa is formed by the shaping material MM ejected from the nozzle 61 before the shaping material MM for shaping the linear shaped object LP. The uppermost layer MLa is an example of the ejection target surface to which the shaping material MM is ejected from the nozzle 61.

When shaping the three-dimensional shaped object by ejecting the shaping material MM from the nozzle 61 toward the uppermost layer MLa, voids may be generated in the shaping material MM ejected to the uppermost layer MLa, between the shaping material MM ejected to the uppermost layer MLa and the uppermost layer MLa, between the shaping materials MMs ejected to the uppermost layer MLa, and the like. When the voids are generated, in addition to decrease in strength and elastic modulus of the shaped three-dimensional shaped object, anisotropy of mechanical properties occurs, and the shaped three-dimensional shaped object may not exhibit a desired function as a structural member.

The three-dimensional shaping device 100 of the present embodiment includes the compression unit 150 which has the contact surface 155 with a shape surrounding the nozzle 61 and applies a pressure to the shaping material MM located between the uppermost layer MLa and the contact surface 155 by bringing the contact surface 155 into contact with the shaping material MM ejected to the uppermost layer MLa so as to be capable of compressing the shaping material MM. Accordingly, the voids in the shaping material MM ejected to the uppermost layer MLa, the gaps generated between the shaping material MM ejected to the uppermost layer MLa and the uppermost layer MLa, the gaps generated between the shaping materials MM ejected to the uppermost layer MLa, and the like can be reduced. Therefore, the three-dimensional shaping device 100 of the present embodiment can provide a three-dimensional shaped object having the desired function as the structural member.

Since the contact surface 155 has the shape surrounding the nozzle 61, when the shaping material MM is ejected to the uppermost layer MLa while the nozzle 61 is moved in the direction along the uppermost layer MLa, it is unnecessary to move the compression unit 150 in the direction along the uppermost layer MLa according to the moving direction of the nozzle 61, and thus the shaping material MM can be easily compressed.

Next, in the present embodiment, a flow of operations when the control unit 500 executes the shaping processing of the three-dimensional shaped object will be described. Here, with reference to FIGS. 7 to 12, an operation of shaping the linear shaped object LP on the uppermost layer MLa will be described as an example. The shaping processing of the three-dimensional shaped object is executed by the control unit 500 when a predetermined start operation is performed by a user on an operation panel provided in the three-dimensional shaping device 100 or on an external computer coupled to the three-dimensional shaping device 100. By executing the shaping processing, the three-dimensional shaping device 100 starts to manufacture the three-dimensional shaped object.

As illustrated in FIG. 7, the control unit 500 controls the moving mechanism 400 to change a relative position between the nozzle 61 and the uppermost layer MLa such that the shaping material MM is ejected from the nozzle 61 to the uppermost layer MLa. As illustrated by an outline arrow in FIG. 7, the control unit 500 causes the nozzle 61 to eject the shaping material MM to a −Z direction side of the uppermost layer MLa while moving the nozzle 61. Specifically, the control unit 500 moves the shaping unit 200 relatively in the +X direction along the uppermost layer MLa while maintaining the distance between the uppermost layer MLa and the nozzle 61, thereby causing the nozzle 61 to eject the shaping material MM while moving the nozzle 61.

The shaping material MM ejected from the nozzle 61 is continuously deposited on the uppermost layer MLa in the moving direction of the nozzle 61. Accordingly, the linear shaped object LP extending linearly along the moving path of the nozzle 61 is shaped. As illustrated in FIG. 7, a dimension he in the Z-axis direction of the shaping material MM ejected from the nozzle 61, that is, the linear shaped object LP is larger than a dimension he in the Z-axis direction of the uppermost layer MLa formed earlier and compressed by the compression unit 150.

The control unit 500 causes the nozzle 61 to eject the shaping material MM while moving the shaping unit 200 relatively in the +X direction and causes the heating unit 120 to heat the uppermost layer MLa. Specifically, the control unit 500 controls the heating unit 120, and as illustrated by the arrow with a broken line in FIG. 7, blows the hot air supplied from the annular flow path 125 from the air outlets 126 toward the uppermost layer MLa located at the +X direction side of the nozzle 61. In this case, in the present embodiment, the control valve 129 of the air outlet 126 located at the +X direction side of the nozzle 61 is in an open state, and the control valves 129 of the other outlets 126 are in a closed state. Accordingly, the shaping material MM is ejected from the nozzle 61 to the heated uppermost layer MLa.

As illustrated in FIG. 8, the control unit 500 causes the nozzle 61 to eject the shaping material MM while moving the shaping unit 200 relatively in the +X direction and causes the compression unit 150 to compress the linear shaped object LP. Specifically, the control unit 500 controls the compression unit 150, and as illustrated in a black arrow in FIG. 8, moves the compressing member 151 from the separation position to the contact position, thereby bringing the contact surface 155 into contact with the linear shaped object LP located on the +Z direction side of the compressing member 151 to compress the linear shaped object LP. A temperature of contact surface 155 is set lower than the temperature of the linear shaped object LP at least when the contact surface 155 comes into contact with the linear shaped object LP. During the compression of the linear shaped object LP performed by the compression unit 150, the control unit 500 controls the heating unit 120 such that a temperature of a region, in the uppermost layer MLa, where the linear shaped object LP is formed is at least lower than a temperature of the linear shaped object LP.

The control unit 500 causes the nozzle 61 to eject the shaping material MM while moving the shaping unit 200 relatively in the +X direction, and as illustrated in black arrows in FIGS. 8 to 11, by repeating reciprocating movement of the compressing member 151 between the separation position and the contact position, the linear shaped object LP shaped on the uppermost layer MLa is compressed. When the amount of shaping material MM ejected from the nozzle 61 per unit time is made as the ejection amount, and a moving speed when the nozzle 61 moves along the uppermost layer MLa while ejecting the shaping material MM to the uppermost layer MLa is made as a scanning speed, the control unit 500 adjusts the moving speed in the reciprocating movement of the contact surface 155 based on at least one of the ejection amount, the scanning speed, and the type of the shaping material MM.

A dimension h in the Z-axis direction of the linear shaped object LP compressed by the compression unit 150 is the same as the dimension hc in the Z-axis direction of the uppermost layer MLa. The dimension hc is determined by the dimension he in the Z-axis direction of the linear shaped object LP before being compressed by the compression unit 150 and the degree of the compression of the shaping material MM which is set according to the type of the shaping material MM.

When the shaping processing of the three-dimensional shaped object is interrupted in the middle, or when the shaping processing of the three-dimensional shaped object is ended, as illustrated in FIG. 11, the control unit 500 moves the shaping unit 200 to a position away from the layers MLs in the +X direction. When the nozzle 61 moves to a +X direction side of the uppermost layer MLa, the control unit 500 closes the valve body 72 of the ejection amount adjusting mechanism 70, and further moves the plunger 82 of the aspiration unit 80 away from the supply flow path 62 in the −X direction.

Figure 12:
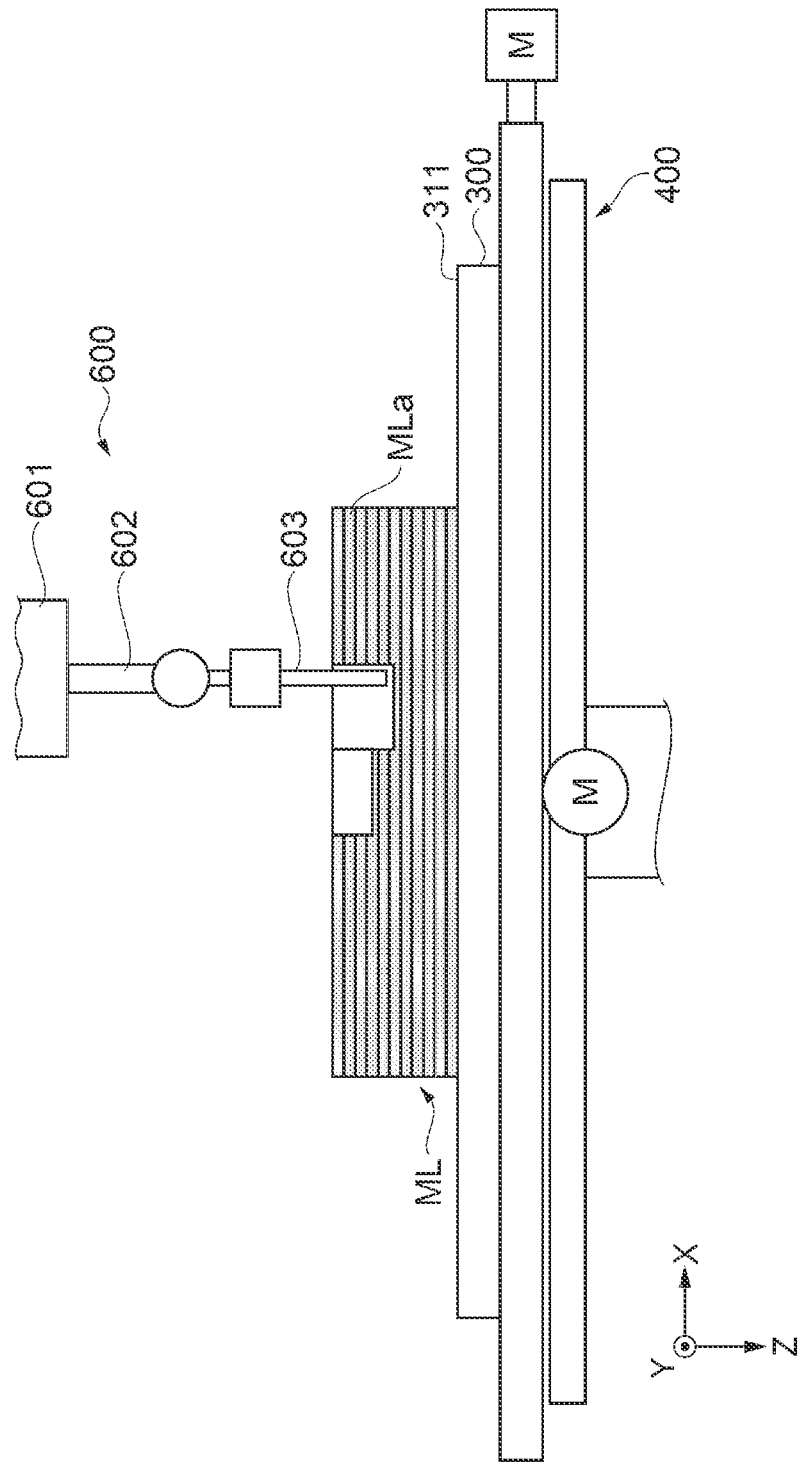
FIG. 12 is a schematic diagram schematically illustrating a manner of cutting the three-dimensional shaped object by a cutting unit.

Then, as illustrated in FIG. 12, if necessary, during the shaping of the three-dimensional shaped object or after the shaping of the three-dimensional shaped object, the control unit 500 drives and controls the cutting portion 600 to cut the layers MLs and finish the layers MLs as a desired three-dimensional shaped object.

As described above, according to the three-dimensional shaping device 100 of the first embodiment, the following effects can be exerted.

The three-dimensional shaping device 100 is the three-dimensional shaping device that shapes the three-dimensional shaped object by ejecting the shaping material MM to the uppermost layer MLa of the table 300 and laminating the layers MLs in the laminating direction. The three-dimensional shaping device 100 includes: the plasticization unit 30 that plasticizes at least a part of the material MR to produce the shaping material MM; the nozzle 61 that has the nozzle tip surface 69S where the nozzle hole 69 opens and that ejects the shaping material MM from the nozzle hole 69 to the uppermost layer MLa; the moving mechanism 400 that changes the relative position between the nozzle 61 and the uppermost layer MLa; the control unit 500 that controls the moving mechanism 400 such that the shaping material MM is ejected from the nozzle 61 to the uppermost layer MLa; and the compression unit 150 that has the contact surface 155 with a shape surrounding the nozzle 61 when viewed from the laminating direction and is capable of compressing the shaping material MM by bringing the contact surface 155 into contact with the shaping material MM ejected to the uppermost layer MLa. Accordingly, when the shaping material MM is ejected to the uppermost layer MLa while the nozzle 61 is moved, it is unnecessary to move the compression unit 150 according to the moving direction of the nozzle 61, and thus the shaping material MM can be easily compressed.

The contact surface 155 is located at the uppermost layer MLa side of the nozzle hole 69 at least when the shaping material MM is compressed. Accordingly, the shaping material MM can be easily compressed.

The compression unit 150 includes the compression unit moving mechanism 152 capable of moving the contact surface 155 to the contact position in contact with the shaping material MM ejected to the uppermost layer MLa and the separation position away from the shaping material MM. Accordingly, the contact surface 155 can be easily moved to the separation position away from the shaping material MM.

The compression unit moving mechanism 152 can change the distance between the contact surface 155 and the uppermost layer MLa at the contact position. Accordingly, for example, the degree of the compression of the shaping material MM can be changed according to the type of the shaping material MM.

When the amount of shaping material MM ejected from the nozzle 61 per unit time is made as the ejection amount, and the moving speed when the nozzle 61 moves along the uppermost layer MLa while ejecting the shaping material MM toward the uppermost layer MLa is made as the scanning speed, the control unit 500 controls the compression unit moving mechanism 152 to reciprocate the contact surface 155 between the contact position and the separation position, and adjusts the moving speed in the reciprocating movement of the contact surface 155 based on at least one of the ejection amount, the scanning speed, and the type of the shaping material MM. Accordingly, by adjusting the moving speed when the contact surface 155 repeatedly comes into contact with the shaping material MM, the voids in the shaping material MM ejected to the uppermost layer MLa, the gaps generated between the shaping material MM ejected to the uppermost layer MLa and the uppermost layer MLa, the gaps generated between the shaping materials MM ejected to the uppermost layer MLa, and the like can be reduced.

During the compression of the shaping material MM performed by the compression unit 150, the temperature of the contact surface 155 is lower than the temperature of the shaping material MM. Accordingly, after the contact surface 155 comes into contact with the shaping material MM, the shaping material MM can be prevented from adhering to the contact surface 155 and becoming the stringing state.

The compression unit 150 includes the heater 154. Accordingly, for example, by raising the temperature of the contact surface 155 with the heater 154, the temperature drop of the shaping material MM due to the contact of the contact surface 155 with the shaping material MM ejected to the uppermost layer MLa can be prevented.

The three-dimensional shaping device 100 includes the heating unit 120 capable of heating the uppermost layer MLa. Accordingly, by heating the uppermost layer MLa, an adhesive force between the shaping material MM ejected to the uppermost layer MLa and the uppermost layer MLa can be improved.

When viewed from the laminating direction, the heating unit 120 includes the heating surface 126S with a shape surrounding the nozzle 61, and the contact surface 155 has a shape surrounding the nozzle 61 and the heating surface 126S. Accordingly, when the shaping material MM is ejected to the uppermost layer MLa while the nozzle 61 is moved, the uppermost layer MLa can be easily heated regardless of the moving direction of the nozzle 61. The shaping material MM ejected to the heated uppermost layer MLa can be easily compressed regardless of the moving direction of the nozzle 61.

When the shaping material MM is ejected from the nozzle 61 toward the uppermost layer MLa as the ejection target surface, the control unit 500 controls the heating unit 120 such that the temperature of the uppermost layer MLa is lower than the temperature of the shaping material MM with which the contact surface 155 is in contact. Accordingly, deformation of the uppermost layer MLa as the ejection target surface can be prevented by compressing the shaping material MM. In this case, the shaping surface 311 is not included as the ejection target surface.

The three-dimensional shaping device 100 includes the cutting portion 600 capable of cutting the three-dimensional shaped object. Accordingly, the three-dimensional shaped object during the shaping or after the shaping can be easily cut.

Here, the material MR of the three-dimensional shaped object used in the above three-dimensional shaping devices 100 will be described. In the three-dimensional shaping device 100, a three-dimensional shaped object can be shaped by using, for example, various materials such as a material having thermoplasticity, a metal material, and a ceramic material as main materials. Here, the "main material" means the material MR which is a core material for forming the shape of the three-dimensional shaped object, and means a material that occupies a content of 50 wt % or more in the three-dimensional shaped object. The above shaping material MM includes a material obtained by melting the main materials individually or a material obtained by melting the main materials and some of the contained components into a paste.

When the material having the thermoplasticity is used as the main material, the shaping material MM is generated by plasticizing the material in the plasticization unit 30.

As the material having the thermoplasticity, for example, the following thermoplastic resin materials can be used.
Examples of Thermoplastic Resin Material General-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyether imide, and polyether ether ketone The material having the thermoplasticity may be mixed with an additive such as wax, a flame retardant, an antioxidant, and a heat stabilizer, in addition to pigment, metal, ceramic, and glass fiber. In the plasticization unit 30, the material having the thermoplasticity is plasticized and converted into a molten state by rotation of the flat screw 40 and heating of the plasticization unit heater 58. The shaping material MM generated by melting the material having thermoplasticity is ejected from the nozzle 61 and then is cured due to a decrease in the temperature.

The material having the thermoplasticity is preferably ejected from the nozzle 61 in a state of being heated to a temperature equal to or higher than a glass transition point of the material and completely melted. For example, when the ABS resin is used, the temperature is preferably about 200° C. at the time of ejecting the material from the nozzle 61.

In the three-dimensional shaping device 100, for example, the following metal material may be used as the main material instead of the above material having the thermoplasticity. In this case, it is preferable that a component melted at the time of generating the shaping material MM is mixed with a powder material obtained by making the following metal material into powder, and the mixture is put to the plasticization unit 30 as the material MR.
Examples of Metal Material Single metals such as magnesium (Mg), ferrum (Fe), cobalt (Co), chromium (Cr), aluminum (Al), titanium (Ti), copper (Cu), and nickel (Ni), or an alloy containing one or more of these metals
Examples of Alloy Maraging steel, stainless steel, a cobalt chromium molybdenum alloy, a titanium alloy, a nickel alloy, an aluminum alloy, a cobalt alloy, and a cobalt chromium alloy In the three-dimensional shaping device 100, a ceramic material can be used as the main material instead of the above metal materials. As the ceramic material, oxide ceramics such as silicon dioxide, titanium dioxide, aluminum oxide, and zirconium oxide, and non-oxide ceramics such as aluminum nitride can be used. When the metal material or the ceramic material as described above is used as the main material, the shaping material MM ejected to the shaping surface 311 may be cured by sintering.

The powder material of the metal material or the ceramic material supplied as the material MR to the material supply portion 20 may be a mixed material obtained by mixing a plurality of types of powder of a single metal, powder of an alloy, or powder of a ceramic material. The powder material of the metal material or the ceramic material may be coated with, for example, the thermoplastic resin as exemplified above or another thermoplastic resin. In this case, in the plasticization unit 30, the thermoplastic resin may be melted to exhibit fluidity.

For example, the following solvent can also be added to the powder material of the metal material or the ceramic material that is supplied to the material supply portion 20 as the material MR. As the solvent, one kind or a combination of two or more kinds selected from the following can be used.
Examples of Solvent Water; (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as a dimethyl sulfoxide solvent and a diethyl sulfoxide solvent; pyridine-based solvents such as a pyridine solvent, a γ-picoline solvent, and a 2,6-lutidine solvent; tetraalkylammonium acetates (for example, tetrabutylammonium acetate); and ionic liquids such as butyl carbitol acetate In addition, for example, the following binder can be added to the powder material of the metal material or the ceramic material that is supplied to the material supply portion 20 as the material MR.
Examples of Binder An acrylic resin, an epoxy resin, a silicone resin, a cellulose-based resin or other synthetic resins or polylactic acid (PLA), polyamide (PA), polyphenylene sulfide (PPS), polyether ether ketone (PEEK), or other thermoplastic resins

2. Second Embodiment

Next, in a second embodiment of the present disclosure, an operation when the control unit 500 executes the shaping processing of the three-dimensional shaped object will be described. Here, with reference to FIG. 13, an operation of shaping the linear shaped object LP on the uppermost layer MLa will be described as an example. The portions common to the three-dimensional shaping device 100 of the first embodiment are denoted by the same reference signs, and descriptions thereof will be omitted.

The three-dimensional shaping device 100 of the present embodiment is the same as the three-dimensional shaping device 100 of the first embodiment. In the present embodiment, the operation when the control unit 500 executes the shaping processing of the three-dimensional shaped object is the same as that in the first embodiment except that a distance in the Z-axis direction between the nozzle tip surface 69S and the uppermost layer MLa when the shaping material MM is ejected from the nozzle 61 toward the uppermost layer MLa is different.

In the first embodiment, when the control unit 500 relatively moves the shaping unit 200 in the +X direction to eject the shaping material MM from the nozzle 61 to the −Z direction side of the uppermost layer MLa while moving the nozzle 61, as illustrated in FIG. 7, the distance in the Z-axis direction between the nozzle tip surface 69S and the uppermost layer MLa is larger than the dimension he in the Z-axis direction of the linear shaped object LP. That is, in the first embodiment, the distance in the Z-axis direction between the nozzle tip surface 69S and the uppermost layer MLa when the shaping material MM is ejected from the nozzle 61 toward the uppermost layer MLa is set such that the nozzle tip surface 69S does not come into contact with the shaping material MM ejected to the uppermost layer MLa.

Figure 13:
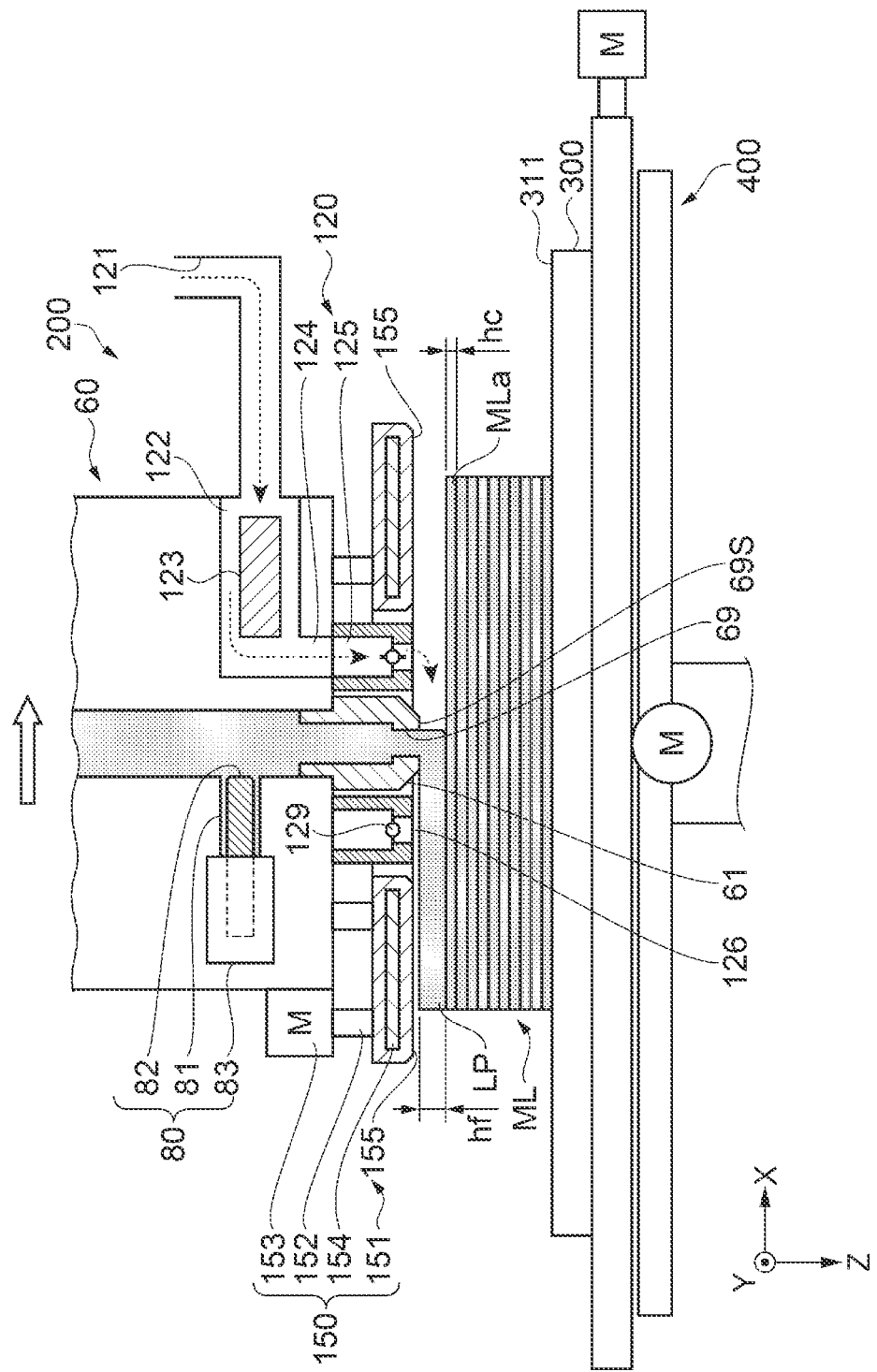
FIG. 13 is a schematic diagram schematically illustrating a manner of ejecting a shaping material from a nozzle to shape a three-dimensional shaped object in another embodiment.

Meanwhile, in the present embodiment, when the control unit 500 relatively moves the shaping unit 200 in the +X direction to eject the shaping material MM from the nozzle 61 to the −Z direction side of the uppermost layer MLa while moving the nozzle 61, as illustrated in FIG. 13, the nozzle tip surface 69S is in contact with the shaping material MM ejected from the nozzle 61 to the uppermost layer MLa. In other words, when the shaping material MM is ejected from the nozzle 61 to the uppermost layer MLa, a distance between the nozzle tip surface 69S and the uppermost layer MLa is set such that the nozzle tip surface 69S comes into contact with the shaping material MM ejected to the uppermost layer MLa. As a result, a dimension hf in the Z-axis direction of the shaping material MM, that is, the linear shaped object LP is smaller than the dimension he in the Z-axis direction of the linear shaped object LP illustrated in FIG. 7, the shaping material MM ejected from the nozzle 61 and applied with the pressure by contact with the nozzle tip surface 69S.

That is, in the present embodiment, when the contact surface 155 of the compressing member 151 in the compression unit 150 is made as a first contact surface, the nozzle tip surface 69S of the nozzle 61 is in contact with the shaping material MM ejected to the uppermost layer MLa, thereby having a function as a second contact surface capable of compressing the shaping material MM. In the present embodiment, by the contact of the nozzle tip surface 69S, the dimension hf in the Z-axis direction of the compressed linear shaped object LP is larger than a dimension he in the Z-axis direction of the uppermost layer MLa formed earlier and compressed by the compression unit 150. In the present embodiment, after that, the control unit 500, similar to the first embodiment, executes the shaping processing of the three-dimensional shaped object illustrated in FIGS. 8 to 12.

As described above, according to the three-dimensional shaping device 100 according to the second embodiment, the following effects can be exerted.

In the three-dimensional shaping device 100, regarding the nozzle 61, when the shaping material MM is ejected from the nozzle 61 to the uppermost layer MLa, the distance between the nozzle tip surface 69S and the uppermost layer MLa is set such that the nozzle tip surface 69S comes into contact with the shaping material MM ejected to the uppermost layer MLa. Accordingly, the shaping material MM is ejected from the nozzle 61, and the ejected shaping material MM can be simultaneously compressed between the nozzle tip surface 69S and the uppermost layer MLa.

The three-dimensional shaping device 100 according to the above embodiments of the present disclosure is based on the configurations as described above, and it is needless to say that the partial configuration may be changed or omitted without departing from the gist of the present disclosure.

The above embodiments and other embodiments described below can be combined with each other in a range where no technical inconsistencies are involved. Hereinafter, other embodiments will be described.

In the control unit 500 of the above embodiments, the degree to which the shaping material MM ejected from the nozzle 61 to the uppermost layer MLa is compressed by the compression unit 150 may be changed based on any of the above-described ejection amount, scanning speed, temperature of the ejected shaping material MM, temperature of the uppermost layer MLa, and an atmospheric temperature, in addition to the type of the shaping material MM.

In the above embodiment, when the control unit 500 causes the nozzle 61 to eject the shaping material MM while moving the shaping unit 200 along the uppermost layer MLa and repeatedly reciprocates the compressing member 151 between the separation position and the contact position, thereby compressing the linear shaped object LP shaped on the uppermost layer MLa, the moving speed in the reciprocating movement of the contact surface 155 may be adjusted based on at least one of the above-described ejection amount, scanning speed, type of shaping material MM, temperature of ejected shaping material MM, temperature of the uppermost layer MLa, and atmospheric temperature.

In the above embodiment, the control unit 500 moves the shaping unit 200 along the uppermost layer MLa and compresses the linear shaped object LP shaped on the uppermost layer MLa while causing the nozzle 61 to eject the shaping material MM, and then may compress the linear shaped object LP shaped on the uppermost layer MLa again while moving the shaping unit 200 along the uppermost layer MLa.

In the above embodiment, the control unit 500 may eject the shaping material MM from the nozzle 61 while moving the shaping unit 200 along the uppermost layer MLa and compress the linear shaped object LP shaped on the uppermost layer MLa. In this case, for example, the control unit 500 may eject the shaping material MM from the nozzle 61 while moving the shaping unit 200 along the uppermost layer MLa, and then compress the linear shaped object LP shaped on the uppermost layer MLa while moving the shaping unit 200 along the uppermost layer MLa before the shaping material MM is cured. For example, the control unit 500 may eject the shaping material MM from the nozzle 61 while moving the shaping unit 200 along the uppermost layer MLa to form a newest layer MLb on the uppermost layer MLa, and then compress the newest layer MLb shaped on the uppermost layer MLa while moving the shaping unit 200 along the newest layer MLb before the newest layer MLb is cured.

In the above embodiment, the compression unit moving mechanism 152 may not include the compression unit motor 153. In this case, a fixing member configured to fix a position of the contact surface 155 of the compression member 151 in the Z-axis direction is provided at least at the contact position, and an operator may operate the fixing member to fix the contact surface 155 in a desired position.

In the above embodiment, the compression unit 150 may not include the compression unit moving mechanism 152. In this case, the contact surface 155 of the compressing member 151 is fixed to the contact position.

In the above embodiment, the compression unit 150 may not include the heater 154.

In the above embodiment, when the control unit 500 causes the nozzle 61 to eject the shaping material MM while moving the shaping unit 200 in the +X direction and causes the heating unit 120 to heat the uppermost layer MLa, the control unit 500 may open the control valve 129 of the air outlet 126 located on the +X direction side of the nozzle 61, and close the control valves 129 of the other outlets 126 in the heating unit 120 to blow the hot air toward the uppermost layer MLa. In this case, for example, the control unit 500 may open the control valve 129 of the air outlet 126 located on the most +X direction side, and close the control valves 129 of the other outlets 126 in the heating unit 120 to blow the hot air toward the uppermost layer MLa located at the +X direction side of the nozzle 61.

In the above embodiment, the control unit 500 may not eject the shaping material MM from the nozzle 61 while moving the shaping unit 200 in the +X direction or cause the heating unit 120 to heat the uppermost layer MLa located on the +X direction side of the nozzle 61. In this case, for example, the control unit 500 may open the control valves 129 of all the air outlets 126 in the heating unit 120 to blow the hot air toward the uppermost layer MLa.

In the above embodiment, when the control unit 500 causes the nozzle 61 to eject the shaping material MM while moving the shaping unit 200 in the +X direction and causes the heating unit 120 to heat the uppermost layer MLa, the control unit 500 may open the control valve 129 of the air outlet 126 located on the most −X direction side in the heating unit 120 to blow the hot air to the linear shaped object LP and compress the linear shaped object LP by an air pressure.

In the above embodiment, when it is unnecessary to improve an adhesive force between the shaping material MM to be ejected and the ejection target surface, the control unit 500 may not cause the heating unit 120 to heat the ejection target surface. For example, when the shaping material MM is ejected onto the shaping surface 311 to form the layers MLs, the shaping surface 311 may not be heated. For example, when the shaping material MM is ejected to a support member fixed on the shaping surface 311 to form the layer ML, the support member may not be heated.

In the above embodiment, the heating unit 120 may not include the control valves 129.

In the above embodiment, the three-dimensional shaping device 100 may not include the heating unit 120.

In the above embodiment, the three-dimensional shaping device 100 may not include the cutting portion 600.

What is claimed is:

1. A three-dimensional shaping device comprising:
a plasticization head configured to plasticize at least a part of a material to produce a shaping material;
a nozzle having a nozzle tip surface where a nozzle hole opens and configured to eject the shaping material from the nozzle hole toward an ejection target surface to form laminating layers for a three-dimensional shaped object, the ejection target surface being either a top surface of the laminating layers or a top surface of a table;
a motor configured to change a relative position between the nozzle and the table along three axes orthogonal to each other;
a plurality of air outlets surrounding the nozzle tip surface;
a plurality of control valves provided at the plurality of air outlets to change output air flow rates from the plurality of air outlets, respectively;
a first heater configured to heat air to be blown from the plurality of air outlets;
a compressor having a contact surface and a second heater, the contact surface surrounding the plurality of air outlets, the second heater heating the contact surface;
a memory configured to store a program; and
a processor configured to execute the program so as to:
cause the plasticization head to produce the shaping material;
cause the nozzle to eject the shaping material toward the ejection target surface;
cause the motor to change the relative position between the nozzle and the table along the three axes;
independently control open and close states of the plurality of control valves to control an amount of the heated air flowing from the plurality of air outlets;
cause the heated air to be blown toward the ejection target surface via at least one outlet of the plurality of air outlets to heat the shaping material ejected to the ejection target surface by controlling the first heater, the at least one outlet being adjacent to the nozzle in a direction in which the nozzle moves relative to the table; and
cause the compressor to bring the contact surface in contact with the shaping material ejected to the ejection target surface to compress the laminating layers,
wherein the plurality of control valves are disposed adjacent to the plurality of air outlets, respectively,
the processor is further configured to:
control the first heater to set a temperature of the shaping material ejected to the ejection target surface at a first temperature after the nozzle ejects the shaping material toward the ejection target surface; and
control the second heater to set a temperature of the contact surface at a second temperature when the compressor brings the contact surface in contact with the shaping material ejected to the ejection target surface to compress the laminating layers, and
the first temperature is higher than the second temperature.

2. The three-dimensional shaping device according to claim 1, wherein
the contact surface of the compressor is located closer to the table than the nozzle tip surface when the contact surface contacts the shaping material ejected to the ejection target surface.

3. The three-dimensional shaping device according to claim 1, wherein
the compressor includes a compressor motor, and
the compressor motor is configured to move the contact surface of the compressor along an up-and-down direction.

4. The three-dimensional shaping device according to claim 3, wherein
the processor is configured to control the compressor motor to change a movement distance toward the shaping material ejected to the ejection target surface when the contact surface contacts the shaping material ejected to the ejection target surface.

5. The three-dimensional shaping device according to claim 3, wherein
when an amount of the shaping material ejected from the nozzle per unit time is defined as an ejection amount and a nozzle moving speed when the nozzle moves along the ejection target surface while ejecting the shaping material to the ejection target surface is defined as a nozzle scanning speed, the processor is configured to control the compressor motor to:
reciprocate the contact surface along the up-and-down direction; and
adjust a contact surface moving speed in the reciprocating movement of the contact surface based on at least one of the ejection amount, the nozzle scanning speed, and a type of the shaping material.

6. The three-dimensional shaping device according to claim 1, wherein
the processor is configured to control the first and second heaters such that when the contact surface of the compressor contacts the shaping material ejected to the ejection target surface, the temperature of the contact surface is lower than the temperature of the shaping material ejected to the ejection target surface.

7. The three-dimensional shaping device according to claim 1, wherein
the plurality of air outlets are formed in a heating surface, the heating surface surrounds the nozzle tip surface, and the contact surface of the compressor surrounds the heating surface and the nozzle tip surface.

8. The three-dimensional shaping device according to claim 1, wherein
when the shaping material is ejected from the nozzle to the ejection target surface, the processor is configured to control the first heater such that a temperature of the ejection target surface is lower than the temperature of the shaping material with which the contact surface is in contact.

9. The three-dimensional shaping device according to claim 1, further comprising:
a cutter configured to cut the three-dimensional shaped object.

10. The three-dimensional shaping device according to claim 1, wherein
when the shaping material is ejected from the nozzle to the ejection target surface, the processor is configured to control the motor to set a distance between the nozzle tip surface and the ejection target surface such that the nozzle tip surface comes into contact with the shaping material ejected to the ejection target surface.

11. The three-dimensional shaping device according to claim 1, further comprising:
a heated air blow structure having a flow path that communicates with the plurality of air outlets, wherein
the heated air blow structure surrounds the nozzle, and a gap is provided between an inner periphery of the heated air blow structure and the nozzle.

12. The three-dimensional shaping device according to claim 1, further comprising:
a heated air blow structure having a flow path that communicates with the plurality of air outlets, wherein
the heated air blow structure surrounds the nozzle, and a heat insulator is provided between an inner periphery of the heated air blow structure and the nozzle.

13. The three-dimensional shaping device according to claim 1, wherein
the processor is further configured to:
open at least one valve of the plurality of control valves corresponding to the at least one air outlet of the plurality of air outlets; and
close the other valves of the plurality of control valves corresponding to the other air outlets of the plurality of air outlets.

14. The three-dimensional shaping device according to claim 1, wherein
the plurality of control valves and the compressor are located on a same horizontal plane when the contact surface of the compressor is spaced apart from the shaping material ejected to the ejection target surface.

15. The three-dimensional shaping device according to claim 1, further comprising:
a heated air blow structure having a flow path that communicates with the plurality of air outlets,
a heated air generation portion having the first heater configured to heat the air to be blown from the plurality of air outlets,
a supply flow path which is connected to the flow path provided in the heated air blow structure configured to supply the heated air generated by the heated air generation portion to the flow path, and
an introduction flow path which is connected to the supply flow path and configured to supply the air to the heated air generation portion.

16. The three-dimensional shaping device according to claim 1, wherein
the second heater is provided inside the compressor.

* * * * *